(12) United States Patent
Ohno et al.

(10) Patent No.: US 7,981,370 B2
(45) Date of Patent: Jul. 19, 2011

(54) HONEYCOMB FILTER AND EXHAUST GAS PURIFYING APPARATUS

(75) Inventors: Kazushige Ohno, Ibi-gun (JP); Akihiro Ohira, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 636 days.

(21) Appl. No.: 12/053,952

(22) Filed: Mar. 24, 2008

(65) Prior Publication Data
US 2008/0241013 A1 Oct. 2, 2008

(30) Foreign Application Priority Data
Mar. 30, 2007 (WO) ............... PCT/JP2007/057303

(51) Int. Cl.
*B01D 50/00* (2006.01)
(52) U.S. Cl. ........................... 422/180; 422/177
(58) Field of Classification Search .............. 422/168, 422/177, 180; 55/523
See application file for complete search history.

(56) References Cited

U.S. PATENT DOCUMENTS

| | | | |
|---|---|---|---|
| 5,914,187 A * | 6/1999 | Naruse et al. .............. 428/327 |
| 6,484,397 B1 * | 11/2002 | Collins et al. ............... 29/890 |
| 6,669,751 B1 | 12/2003 | Ohno et al. | |
| 6,939,825 B1 | 9/2005 | Ohno et al. | |
| 7,112,233 B2 | 9/2006 | Ohno et al. | |
| 7,119,046 B2 | 10/2006 | Ohno et al. | |
| 7,196,037 B2 | 3/2007 | Ohno et al. | |
| 7,250,385 B1 | 7/2007 | Ohno et al. | |
| 7,276,276 B2 * | 10/2007 | Noguchi et al. ............. 428/116 |
| 7,309,370 B2 | 12/2007 | Kudo et al. | |
| 2004/0033175 A1 | 2/2004 | Ohno et al. | |
| 2004/0161596 A1 | 8/2004 | Taoka et al. | |
| 2005/0102987 A1 * | 5/2005 | Kudo .............................. 55/523 |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169818 A1 | 8/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |

(Continued)

FOREIGN PATENT DOCUMENTS
EP   1604719   12/2005
(Continued)

*Primary Examiner* — Tom Duong
(74) *Attorney, Agent, or Firm* — Ditthavong Mori & Steiner, P.C.

(57) ABSTRACT

A honeycomb filter includes a pillar-shaped honeycomb fired body having cells longitudinally disposed with a cell wall and having first and second end faces on gas inlet and outlet sides, respectively. A catalyst supporting layer is formed in a catalyst-supporting-layer area covering at least about 25% and at most about 90% of an overall length of the fired body and that abuts the first end face. Substantially no catalyst supporting layer is formed in a non-catalyst-supporting-layer area covering about 10% of the overall length that abuts the second end face. A thermal conductivity of the non-catalyst-supporting area is larger than that of the catalyst-supporting-layer area, where gas permeability coefficient k1 ($\mu m^2$) of a cell wall in the non-catalyst-supporting-layer area and gas permeability coefficient k2 ($\mu m^2$) of a cell wall in the catalyst-supporting-layer area satisfy inequalities, (k1−k2)≦about 0.5 and about 1.0≦k1≦about 1.5.

26 Claims, 10 Drawing Sheets

A-A line cross-sectional view

U.S. PATENT DOCUMENTS

| | | |
|---|---|---|
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196248 A1 * | 8/2007 | Mizutani ................ 422/180 |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |
| 2008/0017572 A1 | 1/2008 | Kudo |
| 2008/0083202 A1 | 4/2008 | Kunieda et al. |
| 2008/0241009 A1 | 10/2008 | Ohno et al. |
| 2008/0241010 A1 | 10/2008 | Ohno et al. |
| 2008/0241011 A1 | 10/2008 | Ohno et al. |
| 2008/0241012 A1 | 10/2008 | Ohno et al. |
| 2008/0241013 A1 | 10/2008 | Ohno et al. |
| 2008/0247918 A1 | 10/2008 | Ohno et al. |
| 2008/0260599 A1 | 10/2008 | Ohno et al. |

FOREIGN PATENT DOCUMENTS

| | | |
|---|---|---|
| EP | 1634859 | 3/2006 |
| EP | 1736219 | 12/2006 |
| EP | 1826370 | 8/2007 |
| JP | 2003-154223 | 5/2003 |
| JP | 2003-161138 | 6/2003 |

* cited by examiner

A-A line cross-sectional view

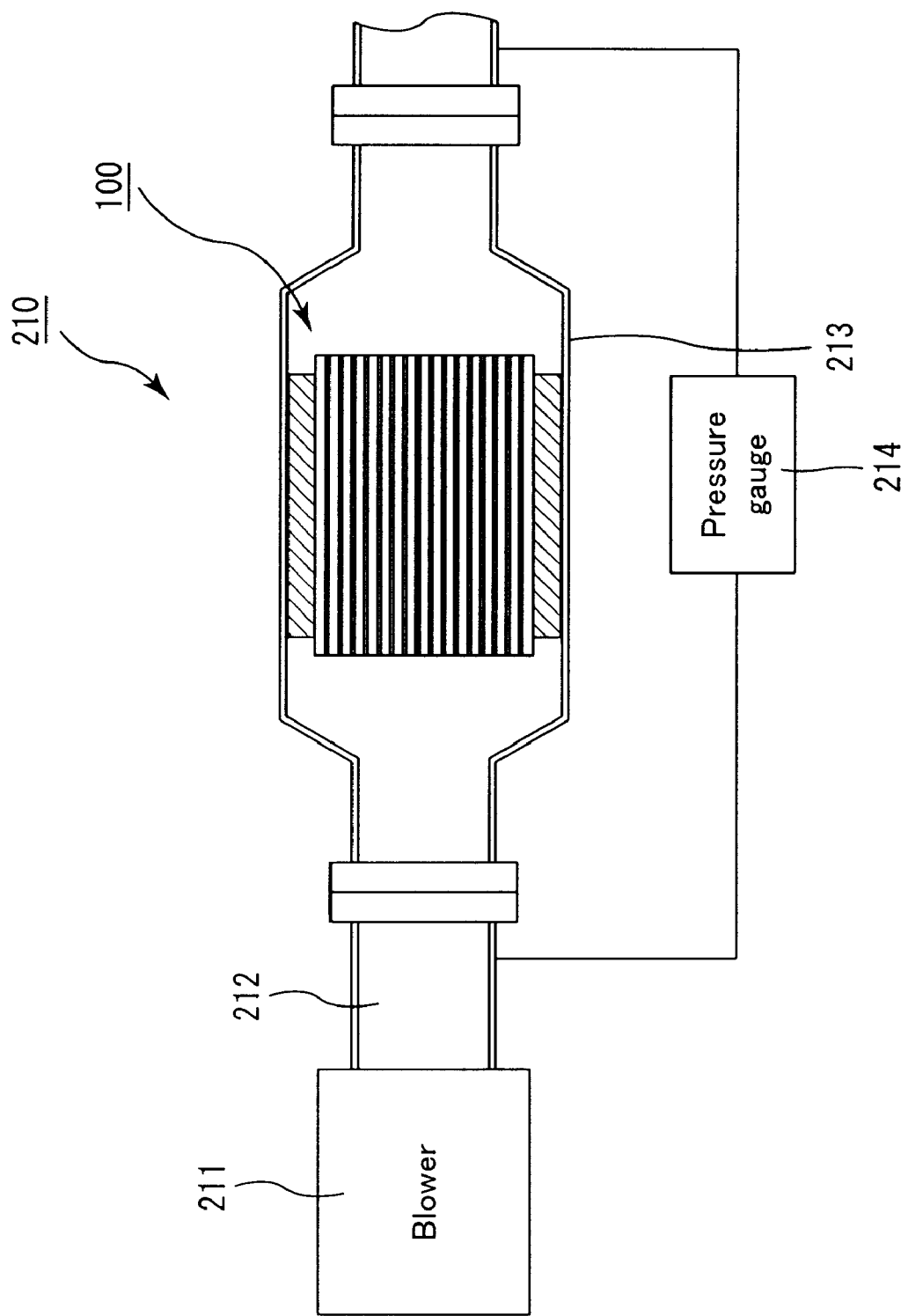

HONEYCOMB FILTER AND EXHAUST GAS PURIFYING APPARATUS

CROSS-REFERENCE TO RELATED APPLICATIONS

The present application claims priority under 35 U.S.C. §119 to PCT Application No. PCT/JP2007/057303, filed on Mar. 30, 2007, the contents of which are incorporated herein by reference in their entirety.

BACKGROUND OF THE INVENTION

1. Field of the Invention

The present invention relates to a honeycomb filter and an exhaust gas purifying system.

2. Discussion of the Background

In recent years, particulate matter (hereinafter, also referred to as "PM") such as soot contained in exhaust gases discharged from internal combustion engines of vehicles such as buses and trucks, construction machines and the like have raised serious problems as contaminants harmful to the environment and the human body. For this reason, various honeycomb filters, which use a honeycomb structured body made of porous ceramics, have been proposed as filters that capture PM in exhaust gases and purify the exhaust gases.

In a honeycomb filter of this kind, a catalyst used for purifying and/or converting exhaust gases may be supported thereon, and in this case, a catalyst supporting layer is formed in an area on which the catalyst is to be supported, so that the catalyst is supported on the catalyst supporting layer.

JP-A 2003-154223 has disclosed a honeycomb filter made from silicon carbide, in which a higher amount of catalyst is supported on the side that allows exhaust gases to flow in (gas inlet side) and a lesser amount of catalyst is supported on the side that allows exhaust gases to flow out (gas outlet side), or a catalyst is supported only on the gas inlet side and substantially no catalyst is supported on the gas outlet side; and an exhaust gas purifying system in which the honeycomb filter of this kind is placed in an exhaust gas passage.

JP-A 2003-161138 has disclosed a honeycomb filter that is designed to make the amount of supported catalyst successively smaller step by step or continuously, from the gas inlet side toward the gas outlet side of the honeycomb filter.

The contents of JP-A 2003-154223 and JP-A 2003-161138 are incorporated herein by reference in their entirety.

SUMMARY OF THE INVENTION

A honeycomb filter of the present invention includes a pillar-shaped honeycomb fired body having a large number of cells longitudinally disposed in parallel with one another with a cell wall therebetween, with either one end of each of the cells being sealed. The honeycomb fired body has a first end face on a gas inlet side and a second end face on a gas outlet side such that the honeycomb filter is configured to allow gases to flow in through the gas inlet side and to flow out from the gas outlet side. A catalyst supporting layer is formed in a catalyst-supporting-layer area that covers at least about 25% and at most about 90% of an overall length of the honeycomb fired body and that abuts the first end face on the gas inlet side. Substantially no catalyst supporting layer is formed in a non-catalyst-supporting-layer area that covers about 10% of the overall length of the honeycomb fired body and that abuts the second end face on the a gas outlet side. A thermal conductivity of the non-catalyst-supporting area is larger than a thermal conductivity of the catalyst-supporting-layer area, where gas permeability coefficients k1 ($\mu m^2$) and k2 ($\mu m^2$) satisfy the following inequalities (1) and (2):

$$(k1-k2) \leq \text{about } 0.5 \quad (1), \text{ and}$$

$$\text{about } 1.0 \leq k1 \leq \text{about } 1.5 \quad (2),$$

in which the gas permeability coefficient k1 is a gas permeability coefficient of a cell wall in the non-catalyst-supporting-layer area in the honeycomb filter, and the gas permeability coefficient k2 is a gas permeability coefficient of a cell wall in the catalyst-supporting-layer area in the honeycomb filter.

An exhaust gas purifying apparatus of the present invention includes: a honeycomb filter; a casing covering an outside of the honeycomb filter; and a holding sealing material interposed between the honeycomb filter and the casing. The honeycomb filter includes a pillar-shaped honeycomb fired body having a large number of cells longitudinally disposed in parallel with one another with a cell wall therebetween, with either one end of each of the cells being sealed. The honeycomb fired body has a first end face on a gas inlet side and a second end face on a gas outlet side such that the honeycomb filter is configured to allow gases to flow in through the gas inlet side and to flow out from the gas outlet side. A catalyst supporting layer is formed in a catalyst-supporting-layer area that covers at least about 25% and at most about 90% of an overall length of the honeycomb fired body and that abuts the first end face on the gas inlet side. Substantially no catalyst supporting layer is formed in a non-catalyst-supporting-layer area that covers about 10% of the overall length of the honeycomb fired body and that abuts the second end face on the a gas outlet side. A thermal conductivity of the non-catalyst-supporting area is larger than a thermal conductivity of the catalyst-supporting-layer area, where gas permeability coefficients k1 ($\mu m^2$) and k2 ($\mu m^2$) satisfy the following inequalities (1) and (2):

$$(k1-k2) \leq \text{about } 0.5 \quad (1), \text{ and}$$

$$\text{about } 1.0 \leq k1 \leq \text{about } 1.5 \quad (2),$$

in which the gas permeability coefficient k1 is a gas permeability coefficient of a cell wall in the non-catalyst-supporting-layer area in the honeycomb filter, and the gas permeability coefficient k2 is a gas permeability coefficient of a cell wall in the catalyst-supporting-layer area in the honeycomb filter.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an explanatory view that shows a pressure loss measuring apparatus;

DESCRIPTION OF THE EMBODIMENTS

Figure 1:
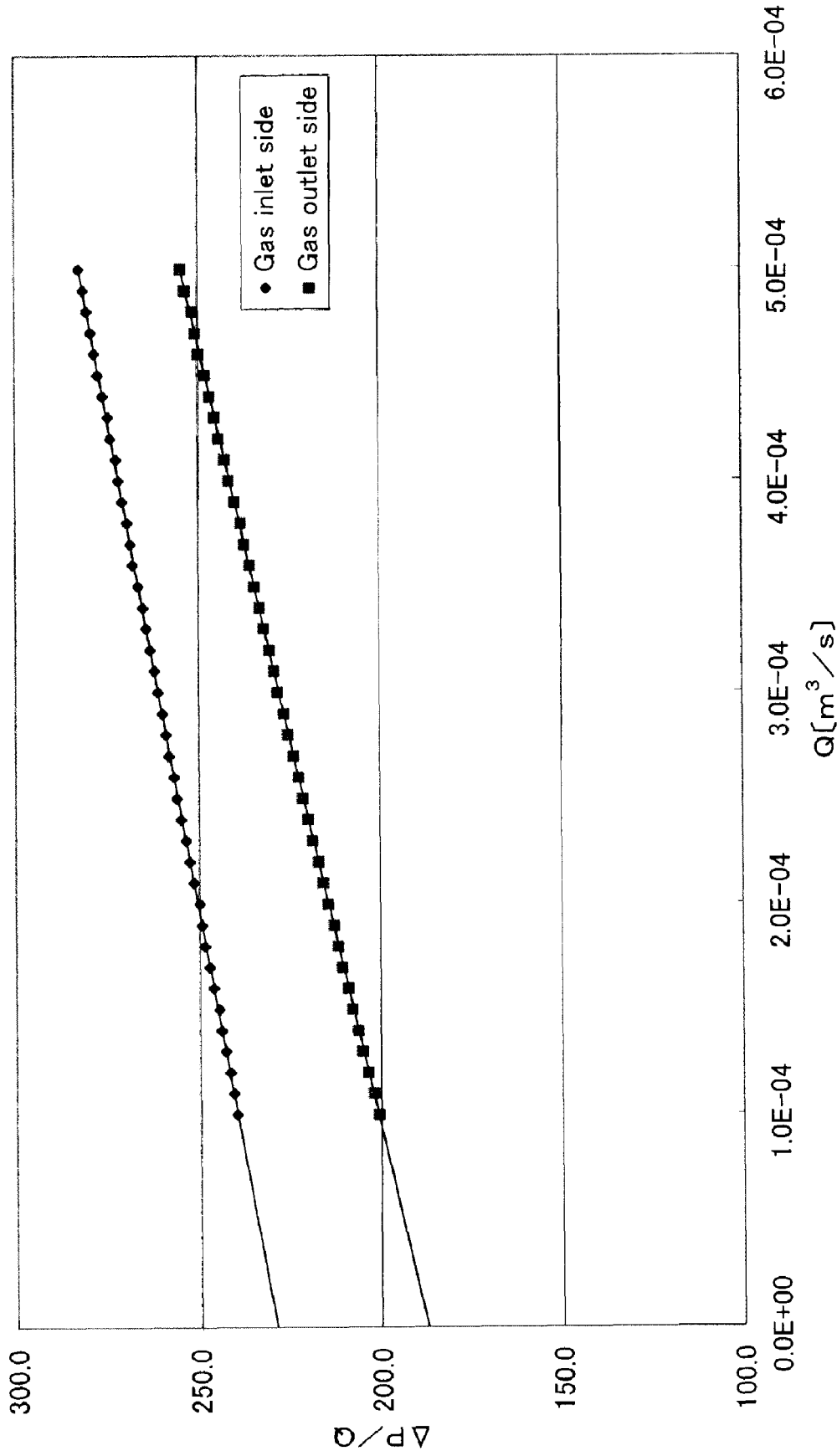
FIG. 1 is a graph that shows an example of the result of plotting Q on the horizontal axis and ΔP/Q on the longitudinal axis.

The embodiments will now be described with reference to the accompanying drawings, wherein like reference numerals designate corresponding or identical elements throughout the various drawings.

In a normal honeycomb filter, since the temperature in the honeycomb filter on the gas outlet side tends to become higher than the temperature in the honeycomb filter on the gas inlet side upon passage of high temperature exhaust gases, PM is sufficiently burned even when the amount of catalyst supported on the gas outlet side of the honeycomb filter is small. The honeycomb filter disclosed in JP-A 2003-154223 and JP-A 2003-161138 has been manufactured considering the phenomenon.

In the honeycomb filters disclosed in JP-A 2003-154223 and JP-A 2003-161138, it may be easier to reduce the amount of catalyst to be supported on the gas outlet side, and consequently to cut production costs.

Moreover, by reducing the amount of catalyst to be supported, the initial pressure loss may be lowered more easily.

It is considered that, in general, the honeycomb filter should be provided with a high regeneration limit value (the maximum value of amount of captured PM which would not cause any cracks in the filter even upon burning captured PM). This is because frequent regeneration processes are required in an exhaust gas purifying system using a honeycomb filter with a low regeneration limit value, which leads to a problem of lowering fuel economy of an internal combustion engine.

However, there has been no consideration on the regeneration limit value in the conventional honeycomb filter (JP-A 2003-154223 and JP-A 2003-161138), so that the conventional honeycomb filter presumably needs improvement in terms of the regeneration limit value.

In accordance with embodiments of the present invention, a honeycomb filter having a higher regeneration limit value is provided. The following was found.

That is, by setting the area covering at least 10% of the overall length of the honeycomb filter from the end face on the gas outlet side of the honeycomb filter as an area without a catalyst supporting layer being formed therein and setting the thermal conductivity of this area covering at least 10% of the overall length larger than the thermal conductivity of the area of the honeycomb filter on which a catalyst supporting layer is formed, heat radiation in the end face neighborhood on the gas outlet side surely progresses. In this case, the temperature rise on the gas outlet side is suppressed, and therefore, a thermal impact caused by the temperature difference between the gas inlet side and the gas outlet side of the honeycomb filter tends not to be generated, thereby more easily achieving a high regeneration limit value in the honeycomb filter.

Moreover, in the case of supporting a catalyst on the honeycomb filter, since a reaction of gases having flowed in generates heat in the area in which the catalyst is supported, the calorific value in the area in which the catalyst is supported tends to become greater than that of the area in which the catalyst is not supported. Here, when the area in which the catalyst is supported is too narrow, a large amount of heat is presumably generated in the narrow area. Further, since the area in which the catalyst supporting layer is formed has a lower thermal conductivity compared to the area in which the catalyst supporting layer is not formed, it is assumed that the area is in a state that hardly causes heat radiation.

For this reason, when the catalyst supporting layer having a catalyst supported thereon is formed in a narrow area, the temperature difference between the corresponding area and the other areas becomes very large, with the result that a greater thermal impact is probably applied onto the honeycomb filter.

To facilitate prevention of a large amount of heat from being generated within a narrow area and consequent prevention of a great thermal impact from being applied onto the honeycomb filter, it was found that, by forming the catalyst supporting layer in the area covering about 25% or more of the overall length of the honeycomb filter out of the area covering about 90% of the overall length of the honeycomb filter from the end face on the gas inlet side, it may be easier to achieve a high regeneration limit value in the honeycomb filter.

Furthermore, with respect to the honeycomb filter with the catalyst supporting layer being formed only in the predetermined area as described above, a state of the honeycomb filter after capturing PM was observed. Then, surprisingly, a phenomenon has been confirmed in which more PM had been captured on the gas outlet side (area in which substantially no catalyst supporting layer is formed) compared to those on the gas inlet side (area in which the catalyst supporting layer is formed).

As indicated by the results of the observation, it is considered that carrying out a regeneration process on a honeycomb filter with more PM captured on the gas outlet side of the honeycomb filter makes the temperature on the gas outlet side higher than the temperature on the gas inlet side; therefore, the temperature difference between the gas inlet side and the gas outlet side of the honeycomb filter becomes greater, with the result that the thermal impact to be applied onto the honeycomb filter becomes greater and cracks are easily generated.

From this point of view, it is presumed that more PM being captured on the gas outlet side of the honeycomb filter causes a reduction in the regeneration limit value of the honeycomb filter.

Further, the reason why more PM is captured on the gas outlet side of the honeycomb filter was studied. In these efforts, when a gas permeability coefficient was measured on each of cell walls in the area on the gas inlet side and the area on the gas outlet side, a remarkable difference was confirmed between the gas permeability coefficients of the cell walls in the two areas, and the gas permeability coefficient of the cell wall on the gas inlet side was considerably smaller than the gas permeability coefficient of the cell wall on the gas outlet side.

Here, the gas permeability coefficient is a parameter that indicates easiness of gases passing through the cell wall of a honeycomb filter. As the gas permeability coefficient becomes higher, the gases are allowed to pass through the cell wall more easily, and therefore, it is presumed that the cell wall on the gas inlet side having a low gas permeability coefficient makes exhaust gases hard to pass through the cell wall, and that consequently, most of the exhaust gases are made to pass through a cell wall on the gas outlet side.

Here, since a larger amount of PM is captured on a cell wall through which more exhaust gases have passed, it was presumed that the difference in the gas permeability coefficients of the gas inlet side and the gas outlet side of a honeycomb filter is the reason why a larger amount of PM is captured on the gas outlet side of a honeycomb filter.

Based upon these, it was found that, in order to increase the regeneration limit value of the honeycomb filter, the honeycomb filter should have a structure in which PM is captured as uniformly as possible from the gas inlet side toward the gas outlet side of the honeycomb filter by designing the honeycomb filter to have smaller difference in the gas permeability coefficients of the cell walls between the gas inlet side and the gas out let side.

Namely, the honeycomb filter according to the embodiments of the present invention is a honeycomb filter including a pillar-shaped honeycomb fired body having a large number of cells longitudinally disposed in parallel with one another with a cell wall therebetween, with either one end of each of the cells being sealed. The honeycomb fired body has a first end face on a gas inlet side and a second end face on a gas outlet side such that the honeycomb filter is configured to allow gases to flow in through the gas inlet side and to flow out from the gas outlet side. A catalyst supporting layer is formed in a catalyst-supporting-layer area that covers at least about 25% and at most about 90% of an overall length of the honeycomb fired body and that abuts the first end face on the gas inlet side, and substantially no catalyst supporting layer is formed in a non-catalyst-supporting-layer area that covers about 10% of the overall length of the honeycomb fired body and that abuts the second end face on the a gas outlet side.

A thermal conductivity of the non-catalyst-supporting area is larger than a thermal conductivity of the catalyst-supporting-layer area, where gas permeability coefficients k1 ($\mu m^2$) and k2 ($\mu m^2$) satisfy the following inequalities (1) and (2):

$(k1-k2) \leq$ about 0.5  (1), and about $1.0 \leq k1 \leq$ about 1.5  (2), in which the gas permeability coefficient k1 is a gas permeability coefficient of a cell wall in the non-catalyst-supporting-layer area in the honeycomb filter, and the gas permeability coefficient k2 is a gas permeability coefficient of a cell wall in the catalyst-supporting-layer area in the honeycomb filter.

In the honeycomb filter according to the embodiments of the present invention, the gas permeability coefficients of the cell walls of the two areas are adjusted so that the gas permeability coefficients k1 and k2 satisfy the relationship of (k1−k2)≦about 0.5.

Between the gas permeability coefficient k and the pressure loss ΔP (kPa), the relationship indicated by the following equations (3) and (4) is held.

$$\Delta P = \frac{\mu Q}{2V_{trap}}(a+w_s)^2 \left[\frac{w_s}{ka} + \frac{8FL}{3a^4}\right] + \frac{2\zeta\rho Q^2(a+w_s)^4}{V_{trap}^2 a^2}\left(\frac{L}{a}\right)^2 \quad (3)$$

Here, Q represents a gas flow rate ($m^3/s$). μ represents a gas kinematic viscosity. Vtrap represents an effective honeycomb structured body volume ($m^3$). "a" represents a cell width (m). Ws represents a cell wall thickness (m). L represents an outer diameter (m) of the honeycomb structured body. ζ, which is referred to as a compression/expansion inertia loss coefficient, represents a parameter derived from a discontinuous change in the gas permeable cross sectional area on each end face of the honeycomb structured body, and is mainly determined by the aperture ratio and shape of each end face of the honeycomb structured body. ρ represents a gas density (kg/$m^3$). F represents a constant value (28.454). Out of these, Vtrap, a, Ws, L, and ζ are determined by the shape of the honeycomb structured body, and μ and ρ are uniquely determined by the temperature and the kind of a gas.

By dividing the both sides of equation (3) by Q and sorting the result, a linear equation of Q to ΔP/Q as indicated by the following equation (4) is obtained.

$$\frac{\Delta P}{Q} = \frac{2\zeta\rho(a+w_s)^4}{V_{trap}^2 a^2}\left(\frac{L}{a}\right)^2 \cdot Q + \frac{\mu w_s}{2aV_{trap}}(a+w_s)^2 \cdot \frac{1}{k} + \frac{\mu}{2V_{trap}}(a+w_s)^2 \frac{8FL}{3a^4} \quad (4)$$

The gas permeability coefficient k can be calculated by using the equation (4).

FIG. 1 is one example of a graph obtained by plotting Q on the horizontal axis and ΔP/Q on the longitudinal axis.

In order to calculate the gas permeability coefficient k, by varying the gas flow rate Q to several values, the pressure loss ΔP is measured, and Q is plotted on the horizontal axis and ΔP/Q is plotted on the longitudinal axis in a graph as shown in FIG. 1. Here, these plotted values virtually form a straight line, so that the relationship between Q and ΔP/Q can be represented by an approximate straight line as shown in FIG. 1. Moreover, the value at the intercept can be obtained from a value at an intersection between the approximate straight line and the longitudinal axis.

In the measurements, since variables other than the gas permeability coefficient k in equation (4) are known quantities determined by the measuring conditions and the structure of the honeycomb structured body, equation (4) is represented as the following equation (5) by using constant values A, $C_1$, and $C_2$.

$$\frac{\Delta P}{Q} = AQ + \frac{C_1}{k} + C_2 \quad (5)$$

Namely, the value at the intercept obtained from the plotted line of FIG. 1 is represented by ($C_1$/k+$C_2$), and based upon this, the gas permeability coefficient k can be calculated.

In the honeycomb filter according to the embodiments of the present invention, a difference between the gas permeability coefficient of the area (gas inlet side) in which the catalyst supporting layer is formed and that of the area (gas outlet side) in which substantially no catalyst supporting layer is formed becomes about 0.5 $\mu m^2$ or less by adjusting the gas permeability coefficients of the cell walls of the two areas.

In the honeycomb filter according to the embodiments of the present invention, since the difference in the gas permeability coefficients is controlled within the above-mentioned range, it may be easier to reduce a difference between easiness of the exhaust gases passing through the cell wall on the gas inlet side and the easiness of the exhaust gases passing through the cell wall on the gas outlet side.

Thus, out of exhaust gases allowed to pass through the cell wall, the proportion of those exhaust gases passing through the area in which the catalyst supporting layer is formed, that is, the cell wall on the gas inlet side, is more likely to be increased; therefore, it allows the cell wall on the gas inlet side to capture more PM.

As a result, the amount of PM to be captured on the cell wall on the gas outlet side tends to be relatively reduced, so that the temperature difference between the gas inlet side and the gas outlet side upon burning PM tends to become smaller. Therefore, cracks hardly occur at the time of regeneration process, and consequently, it may be easier to provide a honeycomb filter having a high regeneration limit value.

Here, in a case where the gas permeability coefficient k1 of the cell wall in the area in which substantially no catalyst supporting layer is formed is about 1.5 $\mu m^2$ or less, this state is not desirable because the capturing efficiency of PM is less likely to be lowered. Moreover, in a case where k1 is about 1.0 $\mu m^2$ or more, this state is not desirable because the pressure loss does not become too high.

Moreover, in the honeycomb filter according to the embodiments of the present invention, since substantially no catalyst supporting layer is formed in an area covering about 10% of the overall length of the honeycomb filter from the end face on the gas outlet side, the thermal conductivity of the area in which substantially no catalyst supporting layer is formed is larger than the thermal conductivity of the area in which the catalyst supporting layer is formed in the honeycomb filter.

By setting the area covering about 10% of the overall length of the honeycomb filter from the end face on the gas outlet side as an area made from a member having a higher thermal conductivity, it may be easier to accelerate heat radiation from the end face neighborhood on the gas outlet side. Consequently, since the temperature rise on the gas outlet side of the honeycomb filter may be prevented more easily, a thermal impact caused by a temperature difference between the gas inlet side and the gas outlet side of the honeycomb filter hardly occurs, making it easier to provide a honeycomb filter having a high regeneration limit value.

Moreover, in a case where a catalyst is supported, heat is generated due to reaction of the gas, and thus the heating value of the area on which the catalyst is supported tends to become higher than the other area on which substantially no catalyst is supported. Furthermore, since the area in which the catalyst supporting layer is formed has a lower thermal conductivity than the area on which substantially no catalyst supporting layer is formed, heat radiation hardly occurs therein. For this reason, it is presumed that in a case where the area on which the catalyst is supported is too narrow, a large quantity of heat is generated in the narrow area to cause a larger temperature difference between the area in which the catalyst is supported on the catalyst supporting layer and the other area in which substantially no catalyst supporting layer is formed, resulting in a larger thermal impact to be applied to the honeycomb filter.

In contrast, when the catalyst supporting layer is formed in an area covering about 25% or more of the overall length of the honeycomb filter from the end face on the gas inlet side as in the case of the honeycomb filter according to the embodiments of the present invention, since, upon supporting the catalyst, the area supporting the catalyst is not too narrow, the temperature difference between the area in which the catalyst is supported on the catalyst supporting layer and the other area in which substantially no catalyst layer is formed does not become too large, and therefore a honeycomb filter having a high regeneration limit value may be obtained more easily.

As described above, in the honeycomb filter according to the embodiments of the present invention, the gas permeability coefficients of the cell walls in the area in which the catalyst supporting layer is formed and the area in which substantially no catalyst supporting layer is formed are controlled to be in a desirable range, and the catalyst supporting layer is formed in a specific area. Therefore, the honeycomb filter according to the embodiments of the present invention is provided with a high regeneration limit value.

In the honeycomb filter according to the embodiments of the present invention, a catalyst is supported on the catalyst supporting layer.

In the honeycomb filter according to the embodiments of the present invention, a toxic component in exhaust gases can be purified and/or converted by the catalyst supported on the catalyst supporting layer.

In the honeycomb filter according to the embodiments of the present invention, the thermal conductivity of the area in which substantially no catalyst supporting layer is formed is at least about 1.3 times and at most about 5.0 times larger than the thermal conductivity of the area in which the catalyst supporting layer is formed in the honeycomb filter.

In the honeycomb filter according to the embodiments of the present invention, since the area in which substantially no catalyst supporting layer is formed in the honeycomb filter has a thermal conductivity at least about 1.3 times and at most about 5.0 times larger than the thermal conductivity of the area in which the catalyst supporting layer is formed in the honeycomb filter, it may be easier to reduce occurrence of a thermal impact caused by a temperature difference between the gas inlet side and the gas outlet side of the honeycomb filter. Therefore, the honeycomb filter according to the embodiments of the present invention is provided with e a higher regeneration limit value.

In the honeycomb filter according to the embodiments of the present invention, a main component of the honeycomb filter includes a carbide ceramic, a nitride ceramic, or a complex of a metal and a carbide ceramic, and a complex of a metal and a nitride ceramic.

Moreover, in the honeycomb filter according to the embodiments of the present invention, a main component of the honeycomb filter includes silicon carbide.

Since any of the above-mentioned materials for the main component of the honeycomb filter has a high thermal conductivity, the honeycomb filters according to the embodiments of the present invention are provided with an extremely high regeneration limit value.

First Embodiment

Referring to Figures, the following description will discuss a first embodiment which is one of the embodiments of the present invention.

Figure 2:
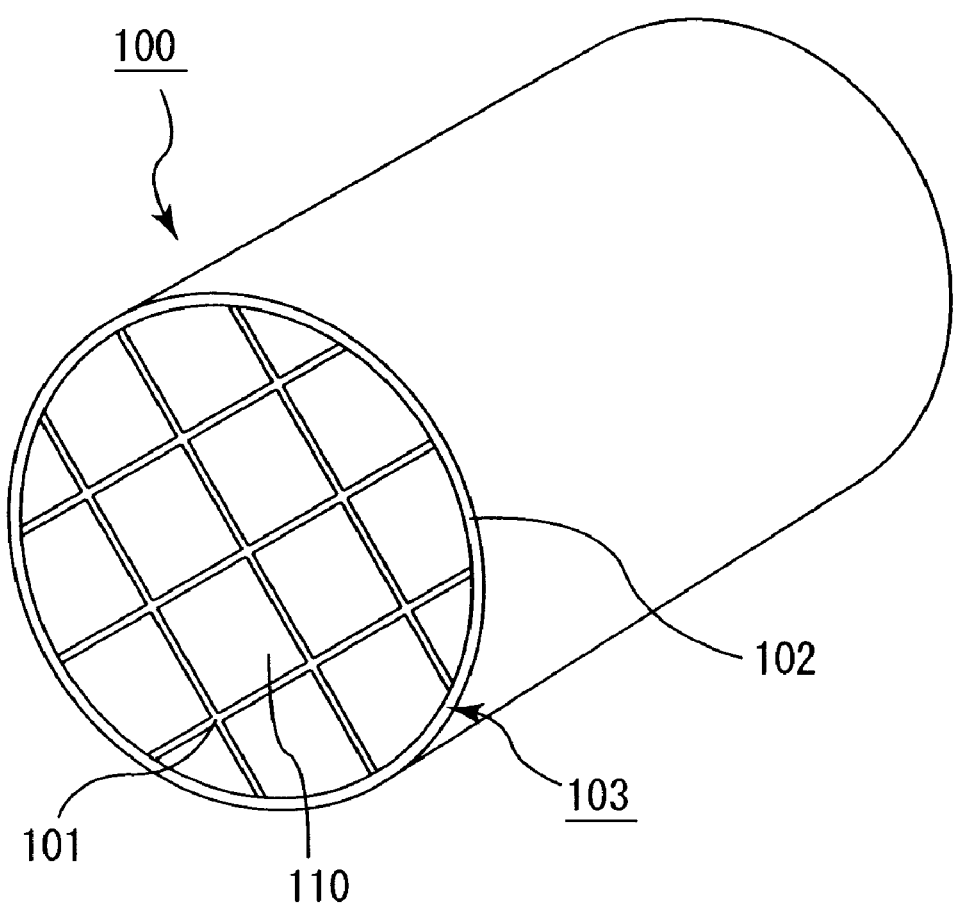
FIG. 2 is a perspective view that schematically shows one example of an embodiment of a honeycomb filter of the present invention.
Figure 3A:
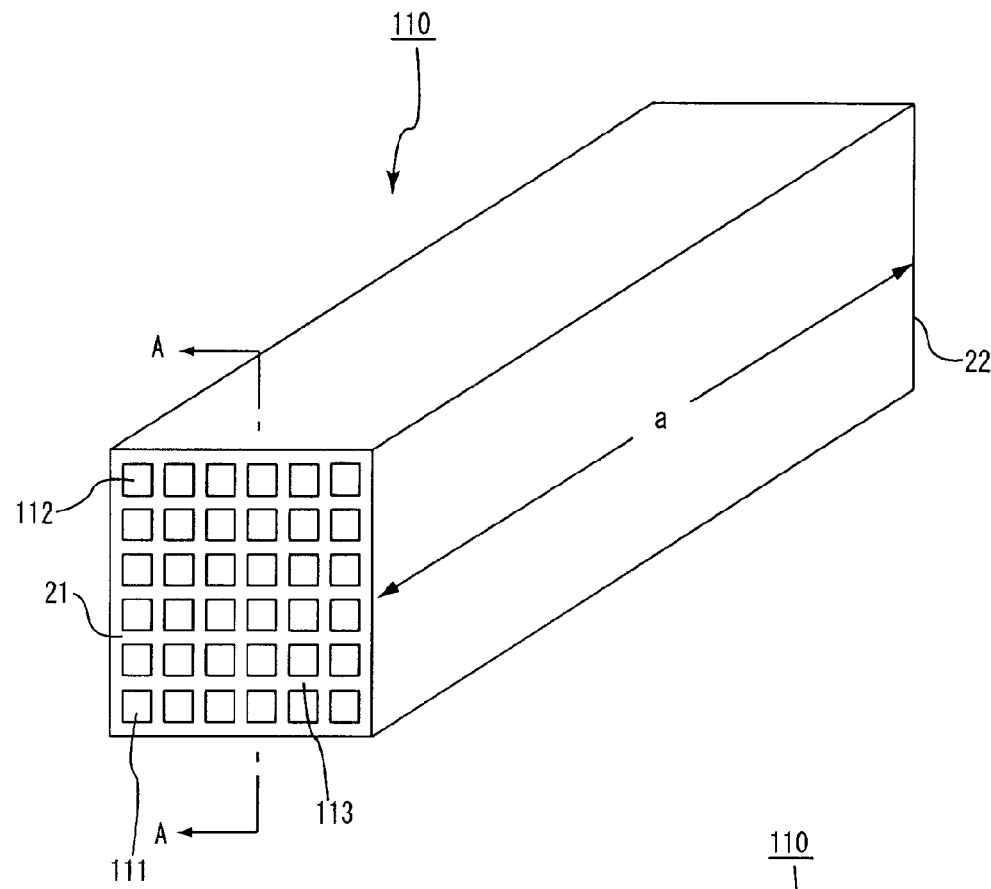
FIG. 3A is a perspective view that schematically shows one example of an embodiment of a honeycomb fired body forming a honeycomb filter of the present invention.

FIG. 2 is a perspective view that schematically shows one example of an embodiment of the honeycomb filter of the present invention. FIG. 3A is a perspective view that schematically shows one example of an embodiment of the honeycomb fired body forming the honeycomb filter of the present invention, and FIG. 3B is a cross-sectional view taken along the line A-A in the FIG. 3A.

Figure 3B:
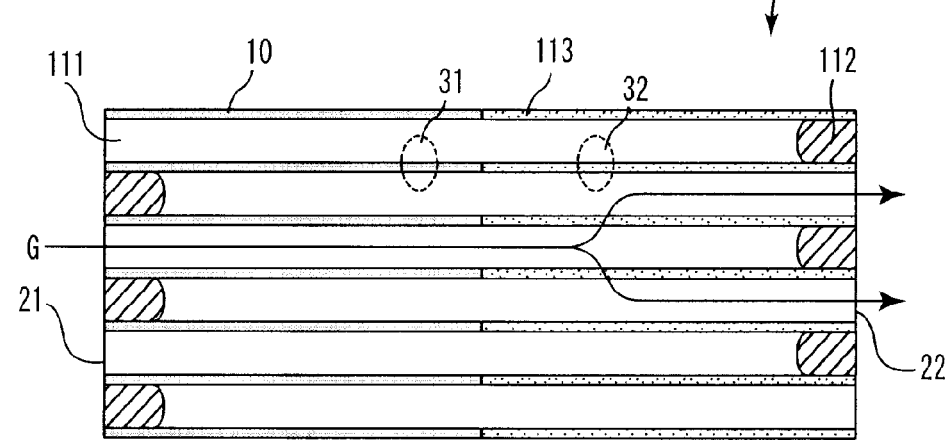
FIG. 3B is a cross-sectional view taken along the line A-A of the FIG. 3A.

In a honeycomb filter 100, a plurality of honeycomb fired bodies as shown in FIGS. 3A and 3B are combined with one another by interposing sealing material layers (adhesive layers) 101 in between to configure a ceramic block 103, and a sealing material layer (coat layer) 102 is formed on the outer periphery of the ceramic block 103.

The honeycomb fired body 110 includes porous silicon carbide as a main component, and is formed by a large number of cells 111 which are placed in parallel with one another in a longitudinal direction (the direction shown by an arrow a in FIG. 3A) with a cell wall 113 therebetween, and the cells 111 are each sealed with a plug 112 at either end thereof. Therefore, exhaust gases G having flown into the cell 111, having an opening on an end face on the gas outlet side, flow out of another cell 111 after surely passing through the cell wall 113 which separates the cells 111.

Accordingly, the cell wall 113 functions as a filter for capturing PM and the like.

In the honeycomb filter of the present embodiment, gas permeability coefficients k1 ($\mu m^2$) and k2 ($\mu m^2$) satisfy the following inequalities (1) and (2):

$$(k1-k2) \leq about\ 0.5 \quad (1)$$

$$about\ 1.0 \leq k1 \leq about\ 1.5 \quad (2)$$

the gas permeability coefficient k1 being a gas permeability coefficient of a cell wall in the area in which substantially no catalyst supporting layer is formed in the honeycomb filter, and the gas permeability coefficient k2 being a gas permeability coefficient of a cell wall in the area in which the catalyst supporting layer is formed in the honeycomb filter.

Moreover, in the honeycomb filter 100, a catalyst supporting layer 10 including an alumina having a platinum (Pt) catalyst supported thereon is formed in a predetermined area of the honeycomb filter 100. As a result, the thermal conductivity of the area in which substantially no catalyst supporting layer 10 is formed in the honeycomb filter 100 becomes larger than the thermal conductivity of the area in which the catalyst supporting layer 10 is formed in the honeycomb filter 100.

Furthermore, by supporting the catalyst on the catalyst supporting layer, it becomes possible to accelerate conversion of toxic components in exhaust gases and/or burning of PM.

Referring to Figures, the following description will discuss the predetermined area in which the catalyst supporting layer 10 is formed.

FIGS. 4A to 4D are cross-sectional views, each of which schematically shows one example of an embodiment of a honeycomb fired body in which a catalyst supporting layer is formed in a predetermined area.

Figure 4A:
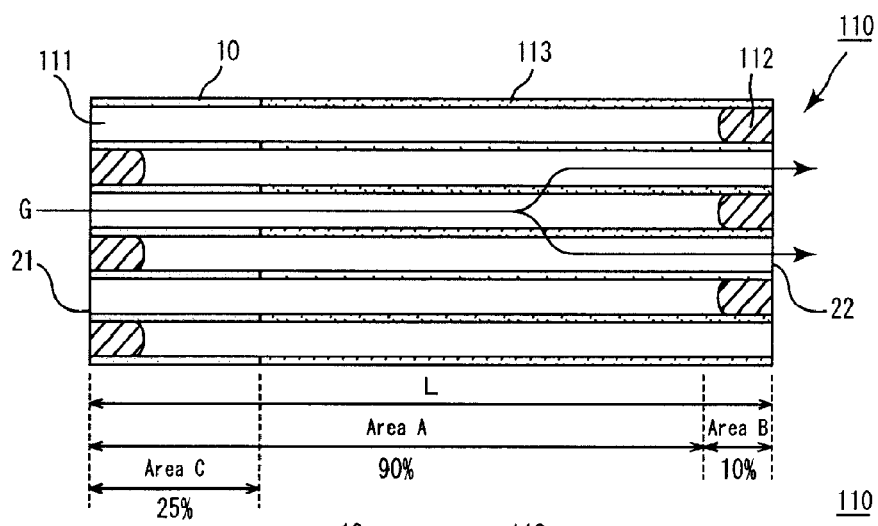
FIGS. 4A to 4D are cross-sectional views, each of which schematically shows one example of an embodiment of a honeycomb fired body in which a catalyst supporting layer is formed in a predetermined area.
Figure 4B:
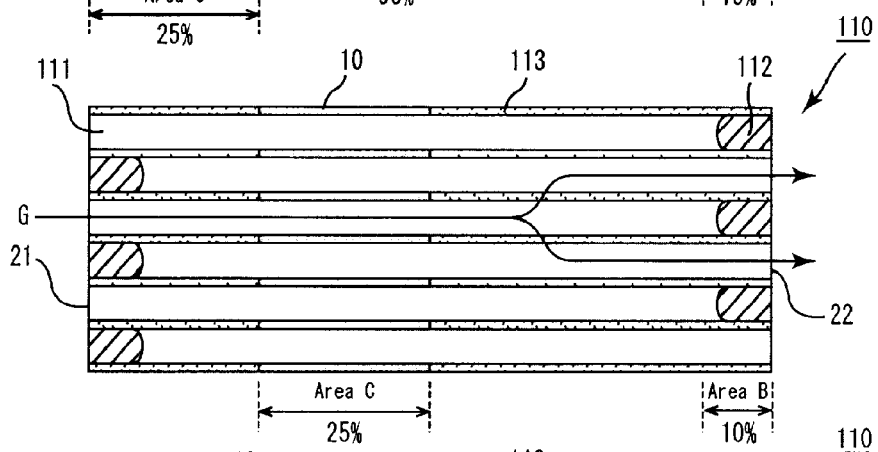
Figure 4C:
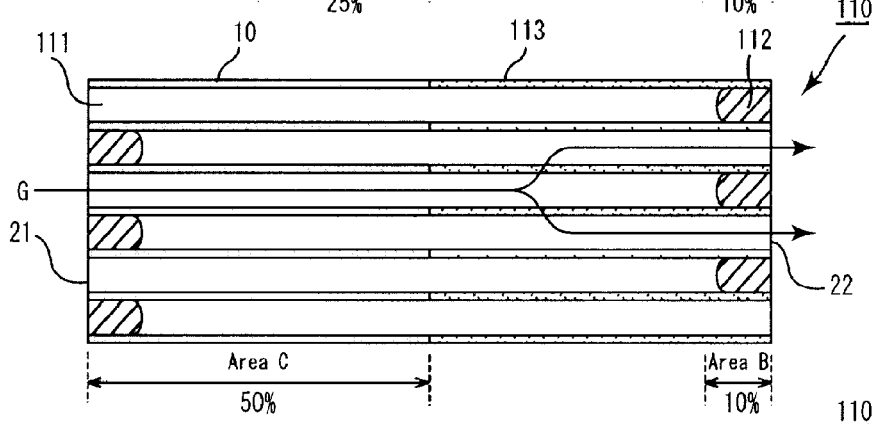
Figure 4D:
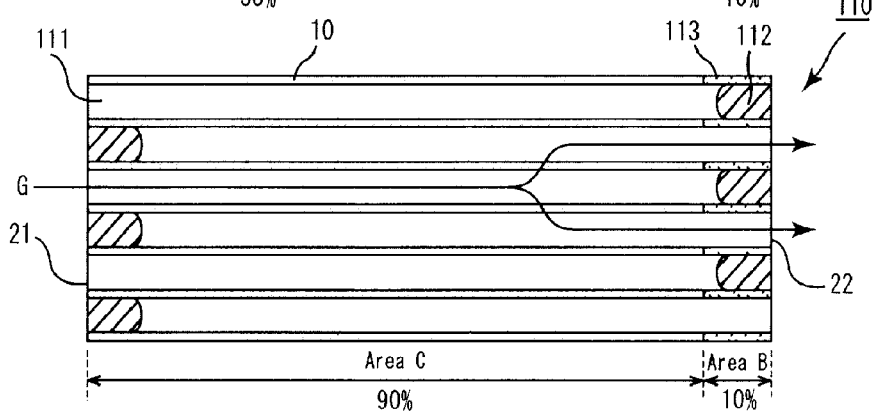

More specifically, in the honeycomb fired body shown in FIG. 4A, a catalyst supporting layer 10 is formed in the area covering about 25% of the overall length L of the honeycomb fired body from the end face 21 on the gas inlet side; in the honeycomb fired body shown in FIG. 4B, the catalyst supporting layer 10 is formed in the area covering at least about 25% and at most about 50% of the overall length L of the honeycomb fired body from the end face 21 on the gas inlet side; in the honeycomb fired body shown in FIG. 4C, the catalyst supporting layer 10 is formed in the area covering about 50% of the overall length L of the honeycomb fired body from the end face 21 on the gas inlet side; and in the honeycomb fired body shown in FIG. 4D, the catalyst supporting layer 10 is formed in the area covering about 90% of the overall length L of the honeycomb fired body from the end face 21 on the gas inlet side.

Here, the overall length of the honeycomb filter is equal to the overall length of the honeycomb fired body.

In each of the honeycomb fired bodies according to an embodiment of the present invention shown in FIGS. 4A to 4D, substantially no catalyst supporting layer is formed in the area covering about 10% of the overall length L of the honeycomb fired body 110 from the end face 22 on the gas outlet side (area B in FIGS. 4A to 4D, also referred to as a non-catalyst-supporting-layer area). Moreover, out of the area covering about 90% of the overall length L of the honeycomb fired body 110 from the end face 21 on the gas inlet side (area A in FIG. 4A), a catalyst supporting layer is formed in the area covering at least about 25% and at most about 90% (area C in FIGS. 4A to 4D, also referred to as a catalyst-supporting-layer area) of the overall length L of the honeycomb fired body 110.

The area C in which the catalyst supporting layer 10 is formed may be provided continuously from the end face 21 on the gas inlet side as shown in FIGS. 4A, 4C, and 4D, or alternatively, this area may also be provided continuously from a position apart from the end face 21 on the gas inlet side as shown in FIG. 4B.

The catalyst supporting layer 10 may be formed on the surface of the cell wall 113, or alternatively, the catalyst supporting layer may also be formed inside the cell walls 113 in the honeycomb fired bodies.

Moreover, in the present embodiment, the honeycomb filter is designed so as to have the higher thermal conductivity in the area in which substantially no catalyst supporting layer is formed in the honeycomb filter than the thermal conductivity in the area in which the catalyst supporting layer is formed in the honeycomb filter. More specifically, the thermal conductivity in the area in which substantially no catalyst supporting layer is formed in the honeycomb filter is at least about 1.3 times and at most about 5.0 times larger than the thermal conductivity in the area in which the catalyst supporting layer is formed in the honeycomb filter.

The thermal conductivities of the two areas are obtained by respectively measuring thermal conductivities with respect to the cell walls at a measuring portion 31 on the gas inlet side and a measuring portion 32 on the gas outlet side, respectively shown in FIG. 3B.

Hereinafter, the following description will discuss the manufacturing methods of a honeycomb filter of the present embodiment.

First, mixed powder is prepared as a ceramic material by dry-mixing a silicon carbide powder having a different average particle diameter, an organic binder, and a pore-forming agent, and concurrently a liquid plasticizer, a lubricant, and water are mixed together to prepare a mixed liquid. Then, the mixed powder and the mixed liquid are mixed by using a wet mixing apparatus so that a wet mixture for manufacturing a molded body is prepared.

At this time, by changing the particle diameters of the ceramic material and the pore-forming agent, as well as adjusting the blending ratios of the respective raw materials, the gas permeability coefficient of the cell wall in the area in which substantially no catalyst supporting layer is formed can be controlled within a desirable range.

Subsequently, the wet mixture is charged into an extrusion-molding machine.

The wet mixture charged into the extrusion-molding machine is extrusion-molded so that a honeycomb molded body having a predetermined shape is manufactured.

Next, the two ends of the honeycomb molded body are cut by using a cutting machine so that the honeycomb molded body is cut into a predetermined length, and the resulting honeycomb molded body is dried by using a drying apparatus. Next, a predetermined amount of a plug material paste to be formed into a plug is filled into ends on the gas outlet side of a group of cells having openings on the end face on the gas inlet side, and ends on the gas inlet side of a group of cells having openings on the end face on the gas outlet side so that the corresponding cells are sealed. Upon sealing the cells, a mask for sealing (plugging) the cells is applied on the end face of the honeycomb molded body (that is, the cut surface resulting from the cutting process) so that the plug material paste is filled only into the cells that need to be sealed.

A honeycomb molded body with sealed cells is manufactured through the above-mentioned processes.

Next, a degreasing process is carried out to heat organic matters of the honeycomb molded body with the sealed cells in a degreasing furnace, and then the resulting honeycomb degreased body is transported to a firing furnace. Subsequently, a firing process is carried out to manufacture a honeycomb fired body.

At this time, by adjusting firing conditions, the gas permeability coefficient of the cell wall in the area in which substantially no catalyst supporting layer is formed can be controlled within a desirable range.

A sealing material paste is applied to a side face of the resulting honeycomb fired body to form a sealing material layer (adhesive layer) thereon, and another honeycomb fired body is successively laminated with the sealing material paste layer interposed therebetween. By repeating these processes, an aggregated body of a predetermined number of honeycomb fired bodies combined with one another is manufactured. Here, with respect to the sealing material paste, for example, a material including an inorganic binder, an organic binder, and at least one of inorganic fibers and inorganic particles may be used.

Next, the aggregated body of honeycomb fired bodies is heated so that the sealing material paste layers are dried and solidified to form sealing material layers (adhesive layers). Thereafter, a cutting process is carried out on the aggregated body of honeycomb fired bodies by using a diamond cutter or the like to form a ceramic block, and the sealing material paste is applied to a peripheral face of the ceramic block, then dried and solidified to form a sealing material layer (coat layer), thereby a honeycomb filter is manufactured.

Next, a catalyst supporting layer including alumina is formed in a predetermined area of the honeycomb filter, and a platinum catalyst is supported on the catalyst supporting layer. More specifically, the following processes (a) and (b) are carried out.

(a) The honeycomb filter is immersed into an alumina solution containing alumina particles, with the face to be the end face on the gas inlet side facing down, so that the predetermined area in which the catalyst supporting layer is to be formed is immersed in the alumina solution; thus, the alumina particles are selectively adhered to the predetermined area of the honeycomb filter.

Thereafter, the honeycomb filter is dried at a temperature of at least about 110° C. and at most about 200° C. for two hours, and the dried honeycomb filter is heated and fired at a temperature of at least about 500° C. and at most about 1000° C. so that the catalyst supporting layer is formed in the predetermined area of the honeycomb filter.

At this time, by adjusting the particle diameter of the alumina particles, the gas permeability coefficient of the cell wall in the area in which the catalyst supporting layer is formed can be controlled within a desirable range.

(b) Next, the honeycomb filter is immersed into a solution of a metal compound containing platinum, with the face to be the end face on the gas inlet side facing down, so that the predetermined area in which the catalyst supporting layer is formed is immersed in the solution, and the immersed honeycomb filter is dried. Then, the dried honeycomb filter is heated and fired at a temperature of at least about 500 and at most about 800° C. under an inert atmosphere, so that a catalyst is supported on the catalyst supporting layer.

Here, in the methods shown in the processes (a) and (b), the catalyst supporting layer is continuously formed from the end face on the gas inlet side of the honeycomb filter, and the catalyst is supported on the catalyst supporting layer. However, in a case where, as shown in FIG. 4B, the catalyst supporting layer is to be continuously formed from a position apart from the end face on the gas inlet side of the honeycomb filter, and the catalyst is to be supported on the catalyst supporting layer, for example, the following method may be used.

That is, prior to carrying out the process (a), an area on the gas inlet side of the honeycomb filter in which substantially no catalyst supporting layer is to be formed is coated with a silicone resin, and those processes up to the drying process of the process (a) are carried out by using alumina particles with a platinum catalyst having been preliminarily applied. Then, the area is further heated to about 300° C. so that the silicone resin is fused and removed therefrom; successively, after the heating and firing processes of the process (a) are carried out, the residual silicone resin on the honeycomb filter is dissolved and removed therefrom by using an acid.

The following description will discuss effects produced by the honeycomb filter of the present embodiment.

(1) The gas permeability coefficients of the cell wall in the area (gas inlet side) in which the catalyst supporting layer is formed and the area (gas outlet side) in which substantially no catalyst supporting layer is formed are adjusted so that a difference of the gas permeability coefficients of the cell walls is about 0.5 μm2 or less.

Since the difference of the gas permeability coefficients is controlled within this range, it may be easier to decrease the difference between easiness of the exhaust gases passing through the cell wall on the gas inlet side and easiness of the exhaust gases passing through the cell wall on the gas outlet side.

Therefore, in exhaust gases having flowed into the cell, a larger proportion of the exhaust gases are more easily allowed to pass through the cell wall in the area in which the catalyst supporting layer is formed, so that the cell wall on the gas inlet side is more easily allowed to capture more PM.

As a result, in the honeycomb filter of the present embodiment, the amount of PM to be captured on the cell wall on the gas outlet side is more likely to be decreased, and upon burning PM, the temperature difference between the gas inlet side and the gas outlet side tends to be decreased.

(2) Since the gas permeability coefficient k1 of the area in which substantially no catalyst supporting layer is formed is about 1.5 μm2 or less, it may be easier to provide a honeycomb filter having a high PM capturing efficiency.

(3) Since the gas permeability coefficient k1 of the area in which substantially no catalyst supporting layer is formed is about 1.0 μm2 or more, it may be easier to provide a honeycomb filter having a low pressure loss.

(4) Since substantially no catalyst supporting layer is formed in the area covering about 10% of the overall length of the honeycomb filter from the end face on the gas outlet side and the area is prepared as an area made of a member having a high thermal conductivity, heat radiation from the end face neighborhood of the gas outlet side may be accelerated more easily. Consequently, since the temperature rise on the gas outlet side of the honeycomb filter is more likely to be prevented, a thermal impact caused by the temperature difference between the gas inlet side and the gas outlet side of the honeycomb filter may be alleviated more easily.

(5) Since the catalyst supporting layer on which the catalyst is supported is formed in an area covering 25% or more of the overall length of the honeycomb filter, the area on which the catalyst is supported tends to be sufficiently large. Therefore, in the regeneration process, it may be easier to prevent a large amount of heat from being generated within a narrow area in the honeycomb filter.

(6) The synergistic effect obtained by controlling the gas permeability coefficient of the area in which substantially no catalyst supporting layer is formed within a desirable range and forming the catalyst supporting layer in a desirable area improve the regeneration limit value.

Consequently, it may be easier to provide a honeycomb filter having a high regeneration limit value.

EXAMPLES

The following description will discuss examples which more specifically disclose the first embodiment of the present invention; however, the present invention is not limited to those examples.

In the following Examples, Reference Examples, and Comparative Examples, honeycomb filters were manufactured to have the gas permeability coefficients k1 (a cell wall in the area in which substantially no catalyst supporting layer is formed) and k2 (a cell wall in the area in which a catalyst supporting layer is formed) of different values, and honeycomb filters were also manufactured to have the various formation range of a catalyst supporting layer; thus, measurements of respective characteristics were carried out thereon.

Here, the honeycomb filter prior to the formation of the catalyst supporting layer, manufactured in each of the Examples and the like, is referred to as "base member".

Example 1

Manufacturing of Honeycomb Fired Body

An amount of 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin having an average particle diameter of 20 μm, 4.6% by weight of an organic binder (methylcellulose), 2.8% by weight of a lubricant (UNILUB, made by NOF Corporation), 1.3% by weight of glycerin, and 13.8% by weight of water were added, and then kneaded to prepare a wet-mixture composite. Then, the wet-mixture composite was extrusion molded so that a raw honeycomb molded body having virtually the same shape as the shape shown in FIG. 3A, with no cells being sealed, was manufactured.

Next, the raw honeycomb molded body was dried by using a microwave drying apparatus to obtain a dried body of the honeycomb molded body. Thereafter, a paste having the same composition as the raw molded body was filled into predetermined cells, and then again dried by a drying apparatus.

The dried honeycomb molded body was degreased at 400° C., and then fired at 2150° C. under normal pressure argon atmosphere for 3 hours so as to manufacture a honeycomb fired body formed by a silicon carbide sintered body with a porosity of 45%, an average pore diameter of 13.0 μm, a size of 34.3 mm×34.3 mm×150 mm, the number of cells (cell density) of 300/inch2 (46.5 pcs/cm2) and a thickness of the cell wall of 0.25 mm (10 mil).

(Manufacturing of Honeycomb Filter)

A large number of honeycomb fired bodies were bonded to one another by using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose, and 28.4% by weight of water. The bonded honeycomb fired bodies were dried at 120° C., and then cut by using a diamond cutter so that a round pillar-shaped ceramic block having the sealing material layer (adhesive layer) with a thickness of 1.0 mm was manufactured.

Next, a sealing material paste layer having a thickness of 0.2 mm was formed on the peripheral portion of the ceramic block by using the sealing material paste. Further, the sealing material paste layer was dried at 120° C. so that a round pillar-shaped honeycomb filter having a size of 143.8 mm in diameter×150 mm in length, with a sealing material layer (coat layer) formed on the periphery thereof, was manufactured. The average particle diameter of the raw material, the composition of the raw material, and the firing temperature of the manufactured honeycomb filter (honeycomb fired body) are shown in Table 1. Moreover, characteristics of the manufactured honeycomb filter (honeycomb fired body) are shown in Table 2.

The honeycomb filter manufactured in the present Example corresponds to the base member 3 among the base members 1 to 8 shown in Table 1 and 2.

Here, in Table 2, the section of "Cell Structure" indicates the thickness (mil) of the cell wall and cell density (pcs/inch$^2$).

TABLE 1

| | Raw material average particle diameter(μm) | | | Raw material component (% by weight) | | | | | | | Firing temperature (° C.) |
|---|---|---|---|---|---|---|---|---|---|---|---|
| | SiC coarse powder | SiC fine powder | Pore forming agent | SiC coarse powder | SiC fine powder | Methyl cellulose | Acrylic resin | UNILU B | Glycerin | Water | |
| Base member 1 | 11 | 0.5 | 0 | 54.6 | 23.4 | 4.3 | 0 | 2.6 | 1.2 | 13.9 | 2250 |
| Base member 2 | 11 | 0.5 | 0 | 54.6 | 23.4 | 4.3 | 0 | 2.6 | 1.2 | 13.9 | 2200 |
| Base member 3 | 22 | 0.5 | 20 | 52.8 | 22.6 | 4.6 | 2.1 | 2.8 | 1.3 | 13.9 | 2150 |
| Base member 4 | 22 | 0.5 | 20 | 52.2 | 22.4 | 4.8 | 2.6 | 2.9 | 1.3 | 13.8 | 2200 |
| Base member 5 | 25 | 0.5 | 20 | 52.2 | 22.4 | 4.8 | 2.6 | 2.9 | 1.3 | 13.8 | 2200 |
| Base member 6 | 11 | 0.5 | 0 | 54.6 | 23.4 | 4.3 | 0 | 2.6 | 1.2 | 13.9 | 2200 |

TABLE 1-continued

| | Raw material average particle diameter(μm) | | | Raw material component (% by weight) | | | | | | | Firing temperature (° C.) |
|---|---|---|---|---|---|---|---|---|---|---|---|
| | SiC coarse powder | SiC fine powder | Pore forming agent | SiC coarse powder | SiC fine powder | Methyl cellulose | Acrylic resin | UNILU B | Glycerin | Water | |
| Base member 7 | 11 | 0.5 | 20 | 51.0 | 21.9 | 4.9 | 3.1 | 2.9 | 1.5 | 14.7 | 2200 |
| Base member 8 | 30 | 0.5 | 20 | 43.5 | 18.6 | 6.0 | 8.5 | 3.6 | 1.6 | 18.2 | 2200 |

TABLE 2

| | Honeycomb filter characteristics | | | |
|---|---|---|---|---|
| | Average pore diameter (μm) | Porosity (%) | Gas permeability coefficient k1 (μm²) | Cell structure* |
| Base member 1 | 11 | 42 | 0.9 | 10/300 |
| Base member 2 | 12 | 42 | 1.0 | 10/300 |
| Base member 3 | 13 | 45 | 1.2 | 10/300 |
| Base member 4 | 15 | 48 | 1.5 | 10/300 |
| Base member 5 | 18 | 48 | 1.6 | 10/300 |
| Base member 6 | 10 | 42 | 0.7 | 14/200 |
| Base member 7 | 10 | 50 | 0.9 | 12/300 |
| Base member 8 | 20 | 65 | 2.6 | 14/200 |

*Cell structure is indicated by thickness (mil) of a cell wall/cell density (pcs/inch²).
*Gas permeability coefficient k1 indicates permeability coefficient on the gas outlet side.

(Forming of Catalyst Supporting Layer)

γ-alumina particles having an average particle diameter of 0.9 μm were mixed with a sufficient amount of water, and stirred to prepare an alumina slurry. A honeycomb filter was immersed in this alumina slurry up to an area covering 33.3% of its overall length (area covering 50 mm from end face on the gas inlet side), with its end face on the gas inlet side facing down, and maintained in this state for one minute.

Next, this honeycomb filter was heated at 110° C. for one hour to be dried, and further fired at 700° C. for one hour so that a catalyst supporting layer was formed in the area covering 33.3% of its overall length from the end face on the gas inlet side of the honeycomb filter.

At this time, the immersing process into the alumina slurry, drying process, and firing process were repeatedly carried out so that the formation amount of the catalyst supporting layer became 60 g per 1 liter volume of the area in which the catalyst supporting layer is formed in the honeycomb filter.

(Supporting of Pt Catalyst)

The honeycomb filter was immersed in diammine dinitro platinum nitric acid ([Pt(NH$_3$)$_2$(NO$_2$)$_2$]HNO$_3$, platinum concentration of 4.53% by weight) up to an area covering 33.3% of its overall length, with its end face on the inlet side of the honeycomb filter facing down and maintained in this state for one minute.

Next, the honeycomb filter was dried at 110° C. for two hours and further fired at 500° C. for one hour under nitrogen atmosphere so that a platinum catalyst was supported on the catalyst supporting layer.

The amount of the supported catalyst was 3 g of platinum with respect to 20 g of alumina of the catalyst supporting layer.

By carrying out the aforementioned processes, a honeycomb filter in which a catalyst supporting layer including alumina was formed in a predetermined area, and a platinum catalyst was supported on the catalyst supporting layer, was manufactured.

The honeycomb filter manufactured as described above was measured as follows.

(Measurement of Gas Permeability Coefficient)

A honeycomb filter was cut in a direction perpendicular to the longitudinal direction of the honeycomb filter at an interface between an area in which a catalyst supporting layer was formed and an area in which substantially no catalyst supporting layer was formed.

Moreover, out of the cells exposed to the cut face, a paste having the same composition as that of the raw molded body was filled into the cells each having the other end that was not sealed, and the paste was dried by using a drying apparatus.

Thus, a honeycomb filter for use in measuring a pressure loss on the gas inlet side, having only the area in which the catalyst supporting layer is formed and having the cells each sealed at either one of the ends, and a honeycomb filter for use in measuring a pressure loss on the gas outlet side, having only the area in which substantially no catalyst supporting layer is formed and having the cells each sealed at either one of the ends were manufactured.

The pressure loss of each of the honeycomb filter for use in measuring a pressure loss on the gas inlet side and the honeycomb filter for use in measuring a pressure loss on the gas outlet side was measured by a pressure loss measuring apparatus 210 as shown in FIG. 5.

In this pressure loss measuring apparatus 210, a honeycomb filter 100 fixed in a metal casing 213 was placed in an exhaust gas pipe 212 of a blower 211, and a pressure gauge 214 was installed so as to detect pressures at the front and back of the honeycomb filter 100.

Here, the pressure loss measuring apparatus 210 was driven with the flow rate of exhaust gases from the blower 211 being made constant, and after 5 minutes from the start of the driving, a pressure difference (pressure loss) was measured.

While the gas flow rate of exhaust gases from the blower 211 was being changed, the pressure loss ΔP relative to each gas flow rate Q was measured. Then, as shown in FIG. 1, a graph in which Q is plotted on the horizontal axis and ΔP/Q being plotted on the longitudinal axis was drawn, and the value of an intercept was calculated.

Based upon the value of the intercept, gas permeability coefficients k1 (a cell wall in the area in which substantially no catalyst supporting layer is formed) and k2 (a cell wall in the area in which a catalyst supporting layer is formed) were obtained.

(Measurement of Thermal Conductivity)

As shown in FIG. 3B, portions of cell walls were cut from the honeycomb filter to form a measuring portion 31 on the gas inlet side and a measuring portion 32 on the gas outlet side, and the thermal conductivity of each of cell walls in the respective measuring portions was measured by a laser flash method.

(Measurement of Regeneration Limit Value)

Figure 6:
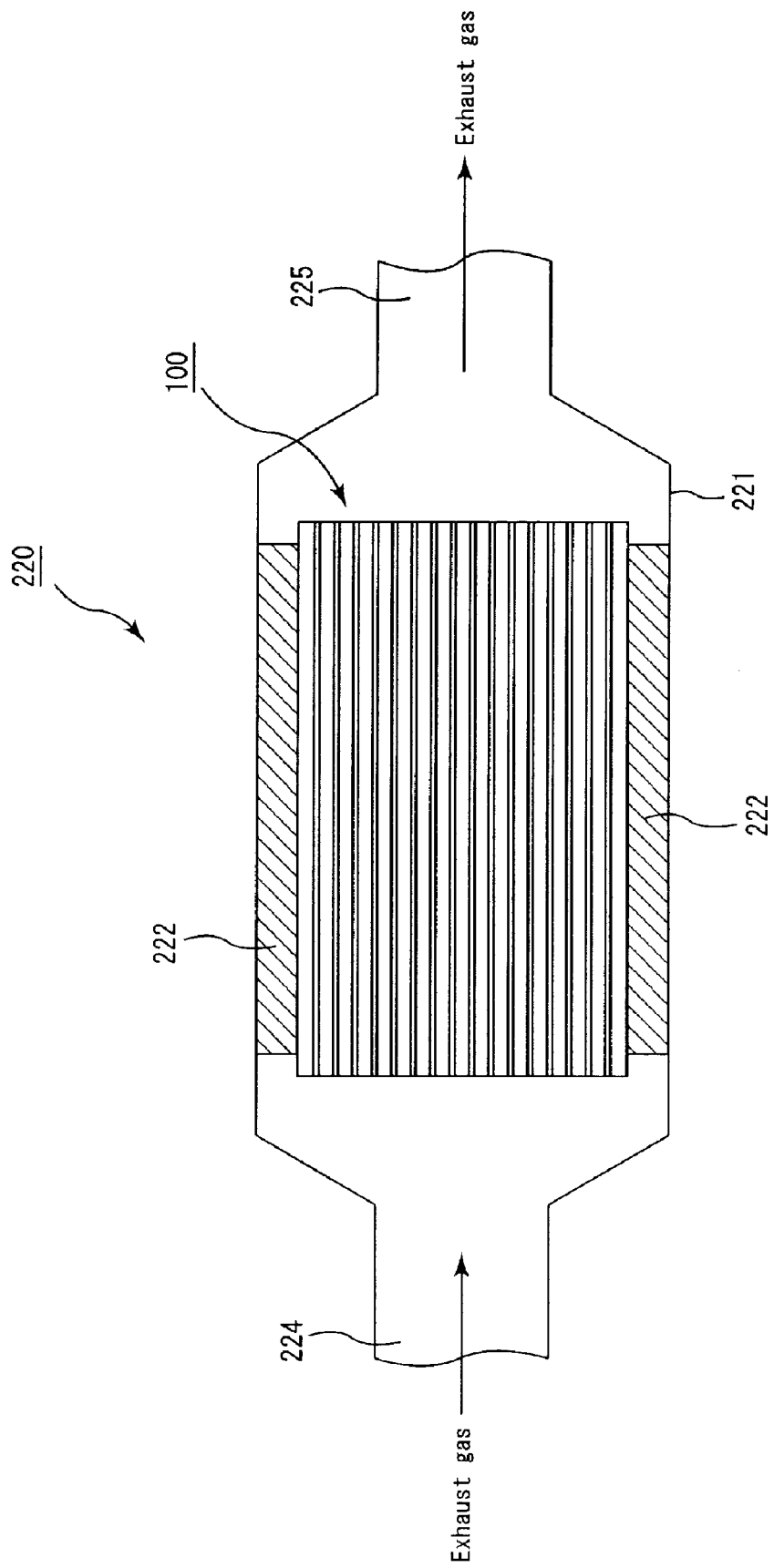
FIG. 6 is a cross-sectional view that shows an exhaust gas purifying apparatus used upon measuring a regeneration limit value.

As shown in FIG. 6, a honeycomb filter is placed in an exhaust passage of an engine so that an exhaust gas purifying apparatus was formed, and the regeneration limit value was measured.

An exhaust gas purifying apparatus 220 was mainly configured with a honeycomb filter 100, a casing 221 that covers the outside of the honeycomb filter 100, and a holding sealing material 222 interposed between the honeycomb filter 100 and the casing 221. Further, an introducing pipe 224, which was coupled to an internal combustion engine such as an engine, was connected to the end portion of the casing 221 on the side from which exhaust gases were introduced, and an exhaust pipe 225 coupled to the outside was connected to the other end portion of the casing 221. Here, in FIG. 6, arrows show flows of exhaust gases.

The engine was driven at the number of revolutions of 3000 min-1 and a torque of 50 Nm for a predetermined period of time so that a predetermined amount of PM was captured. Thereafter, the engine was driven in full load at the number of revolutions of 4000 min-1, and at the time when the filter temperature became constant at about 700° C., the engine was driven slowly at the number of revolutions of 1050 min-1 and a torque of 30 Nm so that PM was forcefully burned.

Then, this experiment was carried out in which a regeneration process was executed while the amount of captured PM was being changed, so that whether or not any cracks occurred in the filter was examined. Here, the maximum amount of PM which would not cause any cracks was defined as the regeneration limit value.

(Measurement of PM Thickness Difference)

The exhaust gas purifying apparatus 220 used for measuring the regeneration limit value was driven to capture 10 g/L of PM in a honeycomb filter. Thereafter, the honeycomb filter was taken out of the exhaust gas purifying apparatus 220, and the honeycomb filter was cut along a direction perpendicular to the longitudinal direction thereof at a position of 25 mm and at a position of 100 mm in the longitudinal direction of the honeycomb filter from the end face on the gas inlet side.

These two cut positions respectively corresponded to center of the area in which the catalyst supporting layer was formed and center of the area in which substantially no catalyst supporting layer was formed, to the longitudinal direction of the honeycomb filter.

Figure 7:
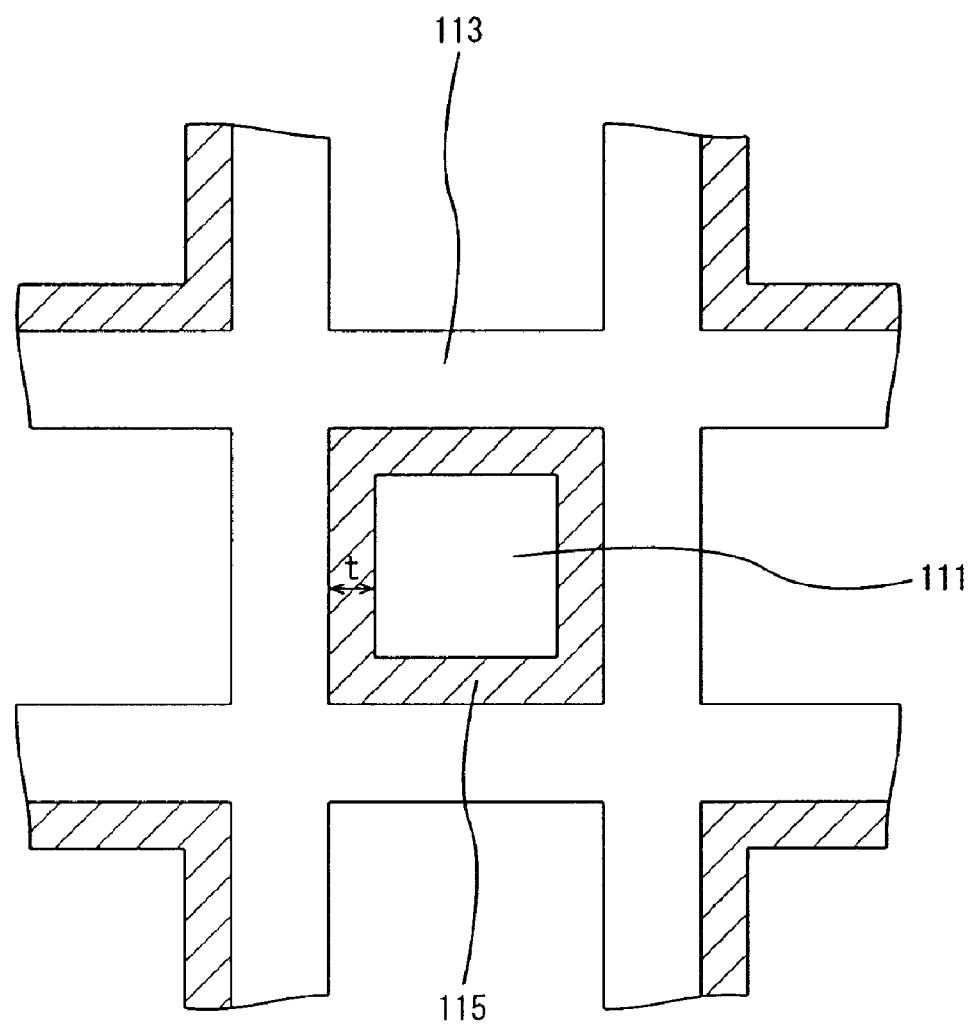
FIG. 7 is a magnified cross-sectional view that schematically shows a method for measuring a thickness of PM on a cut plane of a honeycomb filter.

FIG. 7 is a magnified cross-sectional view that schematically shows a method for measuring a thickness of PM on the cut plane of the honeycomb filter.

FIG. 7 schematically shows a magnified view of one portion of the cut plane of the honeycomb filter observed by an electronic microscope (SEM), and PM 115 is captured on the cell wall 113 forming the cell 111 shown in the center of FIG. 7.

At this time, the thickness of the captured PM 115 was defined as a distance from the surface of the cell wall 113 to the surface of the captured PM 115, that is, a thickness indicated by t in FIG. 7.

The thickness of PM, defined as described above, was measured at a cut-out position on the gas inlet side and at a cut-out position on the gas outlet side of the honeycomb filter.

As a result, in the honeycomb filter of the present embodiment, the thickness of PM captured on the cell wall on the gas outlet side became thicker than the thickness of PM captured on the cell wall on the gas inlet side. Here, the difference between the thickness of PM captured on the cell wall on the gas outlet side and the thickness of PM captured on the cell wall on the gas inlet side was obtained as "PM thickness difference".

(Measurement of Capturing Efficiency)

Figure 8:
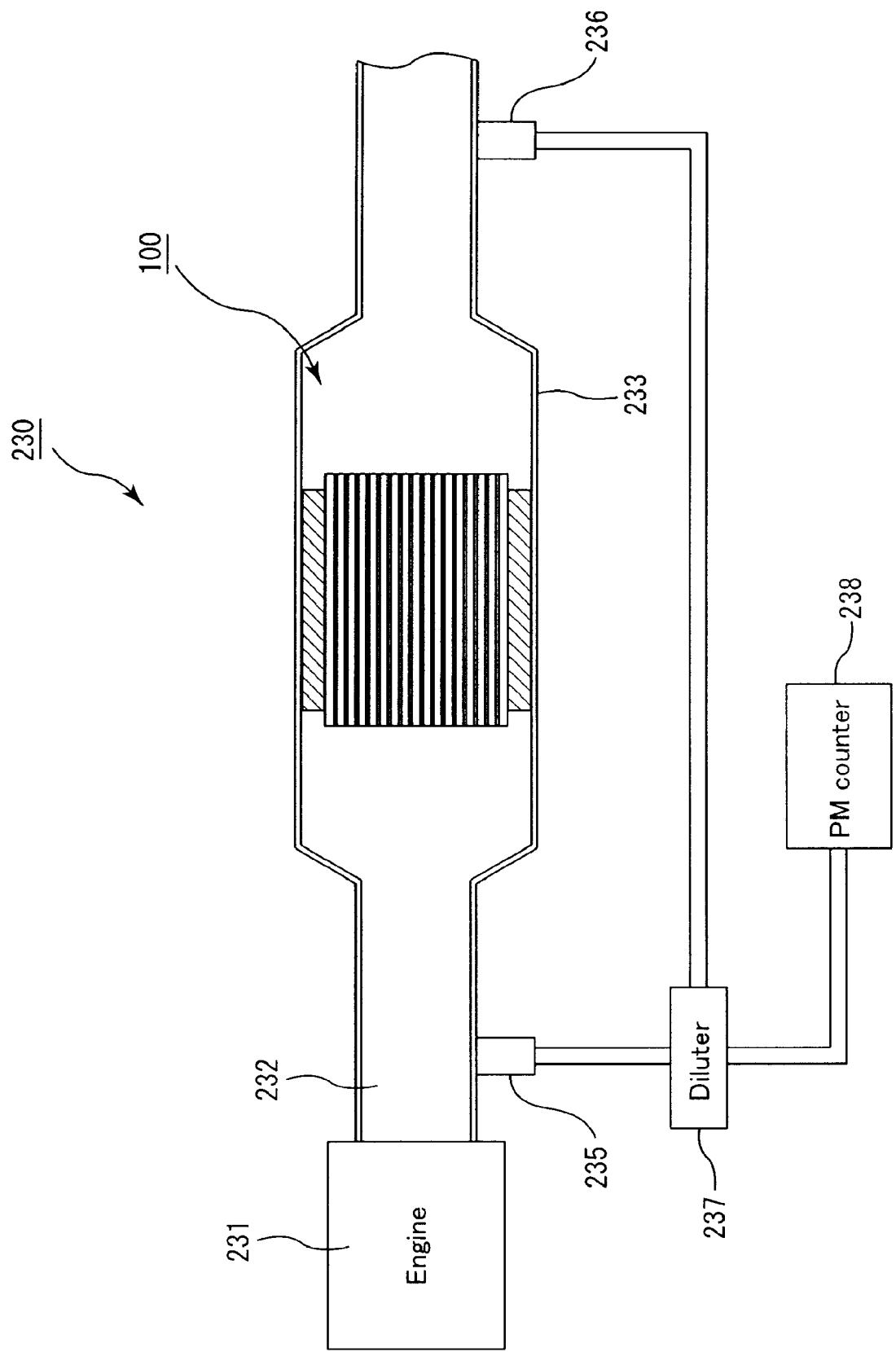
FIG. 8 is an explanatory view that shows a capturing efficiency measuring apparatus.

By using a capturing efficiency measuring apparatus 230 as shown in FIG. 8, the capturing efficiency of PM was measured. FIG. 8 is an explanatory view that shows the capturing efficiency measuring device.

This capturing efficiency measuring apparatus 230 is configured as a scanning mobility particle sizer (SMPS) that is provided with 2 liters of a common-rail-type diesel engine 231, an exhaust gas pipe 232 that allows the exhaust gases from the engine 231 to pass through, a metal casing 233 that is connected to the exhaust gas pipe 232, and secures the honeycomb filter 100 wrapped with an alumina mat, a sampler 235 used for sampling the exhaust gases before passing through the honeycomb filter 100, a sampler 236 used for sampling the exhaust gases after passing through the honeycomb filter 100, a diluter 237 that dilutes the exhaust gases sampled by the samplers 235 and 236, and a PM counter 238 (a condensation particle counter 3022A-S, made by TSI, Inc.) that measures the amount of PM contained in the diluted the exhaust gases.

Next, the measuring procedures are described. The engine 231 was driven at the number of revolutions of 2000 $min^{-1}$ and a torque of 47 Nm, and exhaust gases from the engine 231 were allowed to flow through the honeycomb filter 100. At this time, the amount of PM $P_0$ in the exhaust gases before passing through the honeycomb filter 100 and the amount of PM $P_1$ in the exhaust gases after passing through the honeycomb filter 100 were obtained by using the PM counter 238. Then, the capturing efficiency was calculated based upon the following equation.

$$\text{Capturing efficiency (\%)} = (P_0 - P_1) \times 100 / P_0$$

(Measurement of Pressure Loss of Honeycomb Filter)

By using the above-mentioned pressure loss measuring apparatus 210, the pressure loss of the honeycomb filter was measured in the same manner as the method used upon measuring the gas permeability coefficient.

Here, the blower 211 was driven so that the flow rate of exhaust gases was 750 $m^3$/h, and after 5 minutes from the start of the driving, a pressure difference (pressure loss) was measured.

Table 3 collectively shows: the base member of the honeycomb filter; the formation range, the formation position, and the formation amount of the catalyst supporting layer; and the particle size of alumina particles used for forming the catalyst supporting layer of the honeycomb filter manufactured in Example 1. Further, Table 4 collectively shows the measurement results of the gas permeability coefficient, the thermal conductivity, the PM thickness difference, the regeneration limit value, the pressure loss, and the capturing efficiency.

Here, the formation position of the catalyst supporting layer is indicated by a distance (mm) from the gas inlet side, supposing that the position of the end face on the gas inlet side is 0 mm and that the position of the end face on the gas outlet side is 150.0 mm. In Example 1, since the catalyst supporting layer is formed in an area covering 50.0 mm from the end face on the gas inlet side, the position is given as "0-50.0".

Moreover, the formation amount of the catalyst supporting layer is given as a formation amount per 1 liter volume of the area of the honeycomb filter in which the catalyst supporting layer is formed.

Example 2

Comparative Example 1

The same base members 3 as that of Example 1 were manufactured, and honeycomb filters were manufactured in the same manner as in Example 1, except that the average particle diameter of γ-alumina particles used upon forming a catalyst supporting layer was changed as shown in Table 3 to form a catalyst supporting layer.

The respective characteristics of each of these honeycomb filters were measured in the same manner as in Example 1, and the results of these are collectively shown in Table 4.

TABLE 3

| | | Catalyst supporting layer on inlet side | | | Alumina |
|---|---|---|---|---|---|
| | Base member | Formation range (%) | Formation position (mm) | Formation amount (g/L) | particle diameter (μm) |
| Example 1 | 3 | 33.3 | 0-50.0 | 60.0 | 0.9 |
| Example 2 | 3 | 33.3 | 0-50.0 | 60.0 | 1.5 |
| Comparative Example 1 | 3 | 33.3 | 0-50.0 | 60.0 | 2.6 |

TABLE 4

| | Gas permeability coefficient (μm²) | | | Thermal conductivity (W/mK) | | | PM thickness difference (μm) | Regeneration limit value (g/L) | Pressure loss (kPa) | Capturing efficiency (%) |
|---|---|---|---|---|---|---|---|---|---|---|
| | Inlet side k2 | Outlet side k1 | k1 − k2 | Inlet side | Outlet side | ratio | | | | |
| Example 1 | 0.9 | 1.2 | 0.3 | 8.2 | 17.1 | 2.09 | 27 | 6.6 | 8.0 | 86 |
| Example 2 | 0.7 | 1.2 | 0.5 | 8.4 | 17.1 | 2.04 | 28 | 6.8 | 7.9 | 89 |
| Comparative Example 1 | 0.6 | 1.2 | 0.6 | 8.7 | 17.1 | 1.97 | 52 | 3.8 | 8.3 | 82 |

Tables 3 and 4 show characteristics of honeycomb filters in a case where the gas permeability k2 on the gas inlet side is changed, and in Tables 3 and 4, Example 1 on the uppermost column to Comparative Example 1 on the lowermost column are shown in the descending order of the gas permeability coefficient k2 on the gas inlet side.

Here, the gas permeability coefficient k1 on the gas outlet side was constant at 1.2 μm2, and was always larger than the gas permeability coefficient k2; therefore, the value of (k1−k2) became smaller as the gas permeability coefficient k2 became larger.

Figure 9:
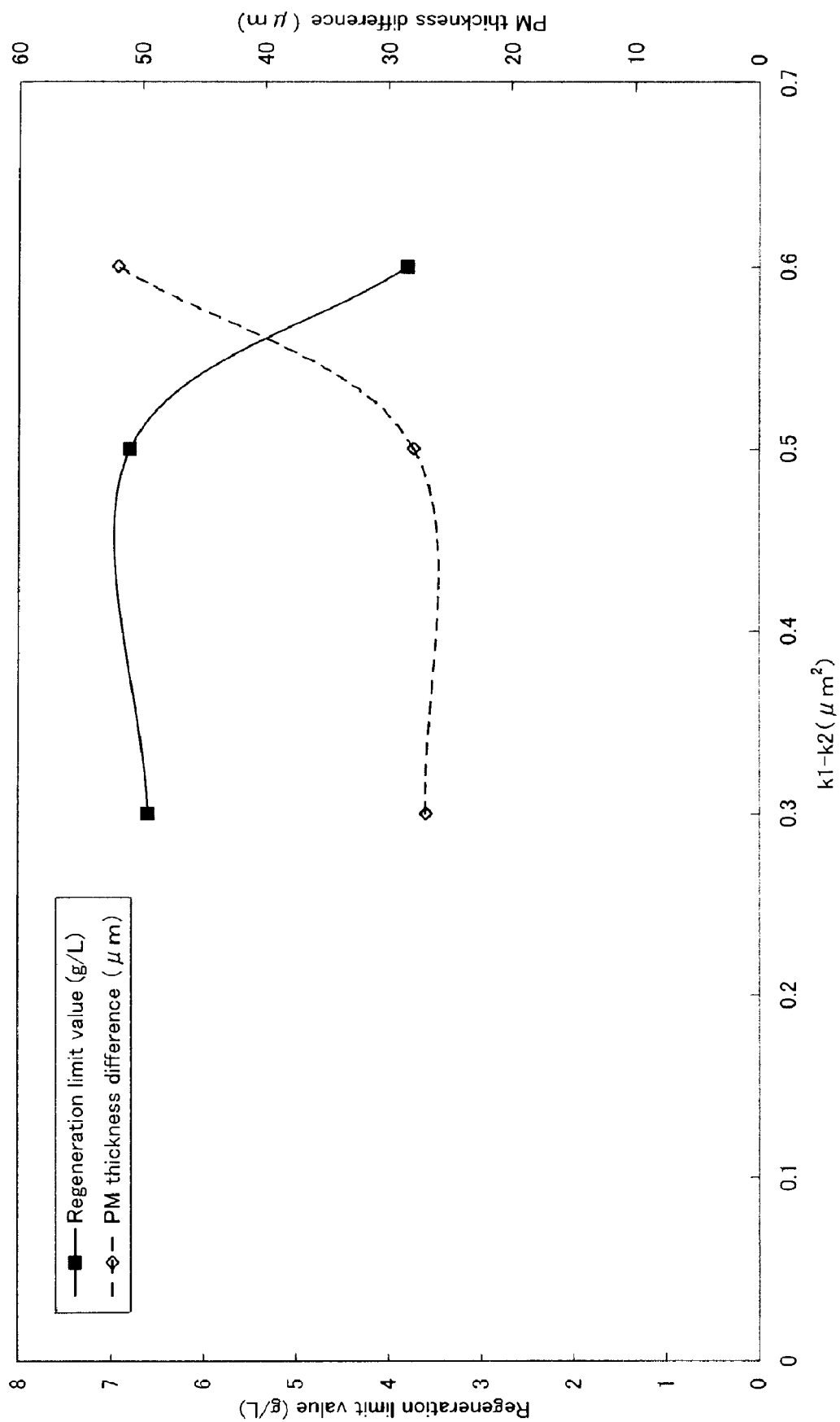
FIG. 9 is a graph that shows a relationship among a difference in the gas permeability coefficients on the gas inlet side and the gas outlet side, the regeneration limit value, and a PM thickness difference in respective Examples and Comparative Examples.

Based upon the results shown in Table 4, FIG. 9 is a graph plotted to show the relationship among the difference in the gas permeability coefficients on the gas inlet side and the gas outlet side, the regeneration limit value, and the PM thickness difference.

Table 4 and FIG. 9 show that in a case where the difference in the gas permeability coefficients on the gas inlet side and the gas outlet side was 0.5 μm2 or less, the regeneration limit value was as high as 6.6 g/L or more.

Moreover, in a case where the difference in the gas permeability coefficients on the gas inlet side and the gas outlet side was 0.5 m² or less, the PM thickness difference was decreased.

From these results, by setting the difference in the gas permeability coefficients on the gas inlet side and the gas outlet side to about 0.5 μm2 or less, it may be easier to comparatively reduce the amount of PM to be captured on the cell wall on the gas outlet side, and consequently to provide a honeycomb filter having a high regeneration limit value.

Examples 3 and 4

Comparative Examples 2 and 3

By changing the average particle diameter of coarse powder of silicon carbide in the mixture composite, the composition of the raw material, and the firing temperature as shown in Table 1, base members 1, 2, 4, and 5 having characteristics as shown in Table 2 were manufactured.

Each of these base members 1 to 5 had different gas permeability coefficient k1 on the gas outlet side ranging from 0.9 to 1.6 μm2.

On each of these base members, a catalyst supporting layer was formed by using γ-alumina particles having an average particle diameter of 1.5 μm in the same manner as in Example 2 to manufacture a honeycomb filter as shown in Table 5.

The respective characteristics of each of these honeycomb filters were measured in the same manner as in Example 1, and the results thereof are shown in Table 6 together with the results of Example 2.

TABLE 5

| | | Catalyst supporting layer on inlet side | | | Alumina |
|---|---|---|---|---|---|
| | Base member | Formation range (%) | Formation position (mm) | Formation amount (g/L) | particle diameter (μm) |
| Comparative Example 2 | 1 | 33.3 | 0-50.0 | 60.0 | 1.5 |
| Example 3 | 2 | 33.3 | 0-50.0 | 60.0 | 1.5 |
| Example 2 | 3 | 33.3 | 0-50.0 | 60.0 | 1.5 |
| Example 4 | 4 | 33.3 | 0-50.0 | 60.0 | 1.5 |
| Comparative Example 3 | 5 | 33.3 | 0-50.0 | 60.0 | 1.5 |

TABLE 6

| | Gas permeability coefficient ($\mu m^2$) | | | Thermal conductivity (W/mK) | | | PM thickness difference ($\mu m$) | Regeneration limit value (g/L) | Pressure loss (kPa) | Capturing efficiency (%) |
|---|---|---|---|---|---|---|---|---|---|---|
| | Inlet side k2 | Outlet side k1 | k1 − k2 | Inlet side | Outlet side | ratio | | | | |
| Comparative Example 2 | 0.4 | 0.9 | 0.5 | 8.7 | 18.7 | 2.15 | 42 | 5.8 | 10.9 | 92 |
| Example 3 | 0.5 | 1.0 | 0.5 | 8.7 | 18.5 | 2.13 | 32 | 7.4 | 8.8 | 93 |
| Example 2 | 0.7 | 1.2 | 0.5 | 8.4 | 17.1 | 2.04 | 28 | 6.8 | 7.9 | 89 |
| Example 4 | 1.1 | 1.5 | 0.4 | 8.1 | 16.6 | 2.05 | 34 | 6.2 | 7.7 | 83 |
| Comparative Example 3 | 1.3 | 1.6 | 0.3 | 8.1 | 16.4 | 2.02 | 38 | 5.1 | 7.7 | 68 |

Tables 5 and 6 show characteristics of a honeycomb filter in a case where the gas permeability coefficient k1 on the gas outlet side is changed, and in Tables 5 and 6, Comparative Example 2 on the uppermost column to Comparative Example 3 on the lowermost column is shown in the ascending order of the gas permeability coefficient k1 on the gas outlet side.

At this time, in Examples 3, 2, and 4, the gas permeability coefficients k1 on the gas outlet side were in a range from 1.0 to 1.5 μm2; therefore, it became possible to provide honeycomb filters with a low pressure loss and a high capturing efficiency.

On the other hand, it is presumed that in Comparative Example 2, the gas permeability coefficient k1 on the gas outlet side was as small as 0.9 $\mu m^2$, resulting in a high pressure loss of 10.9 kPa, while in Comparative Example 3, the gas permeability coefficient k1 on the gas outlet side was as high as 1.6 $\mu m^2$, resulting in a low capturing efficiency of 68%.

Examples 5 to 7

Comparative Examples 4 and 5

Honeycomb filters (base members 3) were manufactured in the same manner as in Example 1, and a catalyst supporting layer was formed on each of these base members by using γ-alumina particles having an average particle diameter of 0.9 μm in the same manner as in Example 1. At this time, by changing the depth to which the honeycomb filters were immersed into a slurry, the catalyst supporting layers were formed in a range from 20 to 100% of the overall length of the honeycomb filter as shown in Table 7.

Moreover, the number of repeated cycles of processes of immersing into an alumina slurry, drying, and firing was changed so that the formation amount of each catalyst supporting layer per 1 liter volume in the area in which the catalyst supporting layer was formed in the honeycomb filter was set to each of values shown in Table 7. This formation amount was designed so that the formation amount of the catalyst supporting layer became 20 g per 1 liter volume of the entire honeycomb filter.

The catalyst was supported on the same area in which the catalyst supporting layer was formed.

The respective characteristics of these honeycomb filters were measured in the same manner as in Example 1, and the results thereof are collectively shown in Table 8 together with the results of Example 1.

TABLE 7

| | | Catalyst supporting layer on inlet side | | | Alumina particle diameter ($\mu m$) |
|---|---|---|---|---|---|
| | Base member | Formation range (%) | Formation position (mm) | Formation amount (g/L) | |
| Comparative Example 4 | 3 | 20.0 | 0-30.0 | 100.0 | 0.9 |
| Example 5 | 3 | 25.0 | 0-37.5 | 80.0 | 0.9 |
| Example 1 | 3 | 33.3 | 0-50.0 | 60.0 | 0.9 |
| Example 6 | 3 | 50.0 | 0-75.0 | 40.0 | 0.9 |
| Example 7 | 3 | 90.0 | 0-135.0 | 22.2 | 0.9 |
| Comparative Example 5 | 3 | 100.0 | 0-150.0 | 20.0 | 0.9 |

TABLE 8

| | Gas permeability coefficient ($\mu m^2$) | | | Thermal conductivity (W/mK) | | | PM thickness difference ($\mu m$) | Regeneration limit value (g/L) | Pressure loss (kPa) | Capturing efficiency (%) |
|---|---|---|---|---|---|---|---|---|---|---|
| | Inlet side k2 | Outlet side k1 | k1 − k2 | Inlet side | Outlet side | ratio | | | | |
| Comparative Example 4 | 0.7 | 1.2 | 0.5 | 5.9 | 17.1 | 2.90 | 59 | 3.7 | 8.4 | 83 |
| Example 5 | 0.8 | 1.2 | 0.4 | 7.0 | 17.1 | 2.44 | 39 | 6.3 | 8.3 | 85 |
| Example 1 | 0.9 | 1.2 | 0.3 | 8.2 | 17.1 | 2.09 | 27 | 6.8 | 8.0 | 86 |
| Example 6 | 1.0 | 1.2 | 0.2 | 9.9 | 17.1 | 1.73 | 25 | 6.8 | 8.0 | 88 |
| Example 7 | 1.1 | 1.2 | 0.1 | 12.5 | 17.1 | 1.37 | 25 | 6.6 | 7.9 | 88 |
| Comparative Example 5 | 1.1 | | NA | 12.8 | | NA | 11 | 3.3 | 7.9 | 86 |

Tables 7 and 8 show characteristics of honeycomb filters in a case where a range for forming the catalyst supporting layer is changed, and in Table 7 and 8, Comparative Example 4 on the uppermost column to Comparative Example 5 on the lowermost column are shown in the ascending order of the formation ranges of the catalyst supporting layer.

Figure 10:
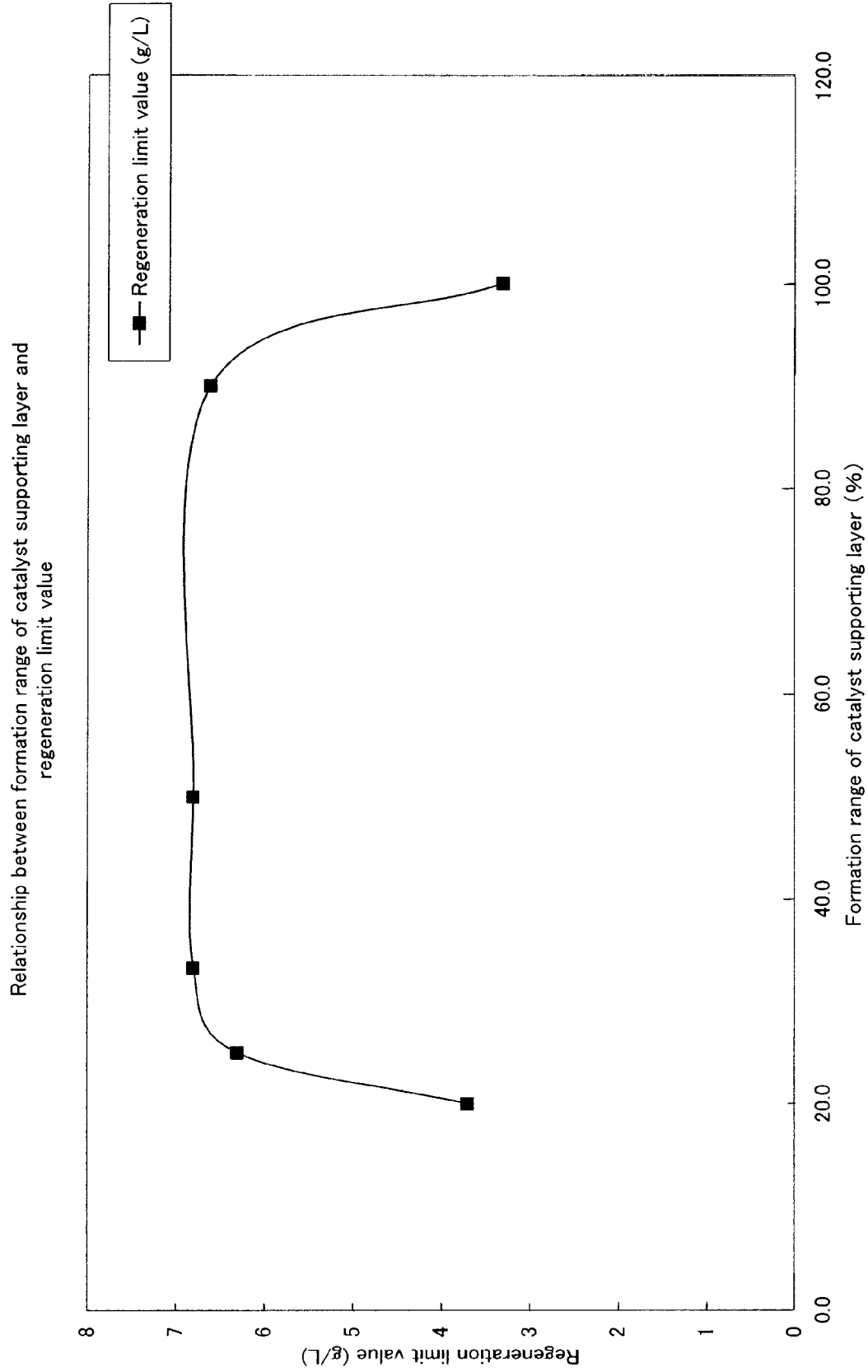
FIG. 10 is a graph that shows a relationship between a formation range of a catalyst supporting layer and a regeneration limit value.

Based upon the results indicated by Table 8, FIG. 10 shows a graph plotted to show the relationship between the formation range of the catalyst supporting layer and the regeneration limit value.

As indicated by Table 8 and FIG. 10, when the formation ranges of the catalyst supporting layer on the gas inlet side ranging from 25 to 90%, the regeneration limit value was as high as 6.3 g/L or more, and in cases where the formation ranges of the catalyst supporting layer on the gas inlet side were 20% and 100%, the respective regeneration limit values were as low as 3.7 g/L and 3.3 g/L.

In other words, by forming the catalyst supporting layer in an area within the range specified by the embodiment of the present invention, it became possible to provide a honeycomb filter having a high regeneration limit value.

Reference Example 1

A honeycomb filter was manufactured in the same manner as in Example 5, except that the average particle diameter of γ-alumina particles used upon forming the catalyst supporting layer was changed to 0.5 μm shown in Table 9.

The respective characteristics of the honeycomb filter were measured in the same manner as in Example 5, and the results thereof are collectively shown in Table 10 together with the results of Example 5.

outlet side measuring portion to the thermal conductivity of the gas inlet side measuring portion is as high as 5.03, and the regeneration limit value was as comparatively low as 5.9 g/L.

Comparative Examples 6, 7, and 8

By changing the average particle diameter of coarse powder of silicon carbide in the mixture composite, the composition of the raw material, and the firing temperature to values as shown in Table 1, the average pore diameter, the porosity, and the gas permeability coefficient k1 on the gas outlet side were controlled. Further, by changing the design of the die used upon extrusion-molding, the cell structure was controlled. Based upon these, base members 6 to 8 having characteristics shown in Table 2 were manufactured. On each of these base members 6 to 8, the catalyst supporting layer made of γ-alumina was formed within a range as shown in Table 11 by using a sol-gel method and a catalyst was supported on the catalyst supporting layer to manufacture a honeycomb filter.

The respective characteristics of each of these honeycomb filters were measured in the same manner as in Example 1, and the results thereof are collectively shown in Table 12.

TABLE 9

|  | Base member | Catalyst supporting layer on inlet side | | | Alumina particle diameter (μm) |
|---|---|---|---|---|---|
|  |  | Formation range (%) | Formation position (mm) | Formation amount (g/L) |  |
| Example 5 | 3 | 25.0 | 0-37.5 | 80.0 | 0.9 |
| Reference Example 1 | 3 | 25.0 | 0-37.5 | 80.0 | 0.5 |

TABLE 11

|  | Base member | Catalyst supporting layer on inlet side | | | Alumina particle diameter (μm) |
|---|---|---|---|---|---|
|  |  | Formation range (%) | Formation position (mm) | Formation amount (g/L) |  |
| Comparative Example 6 | 6 | 33.3 | 0-50.0 | 60.0 | NA |
| Comparative Example 7 | 7 | 33.3 | 0-50.0 | 60.0 | NA |
| Comparative Example 8 | 8 | 33.3 | 0-50.0 | 60.0 | NA |

TABLE 10

|  | Gas permeability coefficient (μm²) | | | Thermal conductivity (W/mK) | | | PM thickness difference (μm) | Regeneration limit value (g/L) | Pressure loss (kPa) | Capturing efficiency (%) |
|---|---|---|---|---|---|---|---|---|---|---|
|  | Inlet side k2 | Outlet side k1 | k1 − k2 | Inlet side | Outlet side | ratio |  |  |  |  |
| Example 5 | 0.8 | 1.2 | 0.4 | 7.0 | 17.1 | 2.44 | 39 | 6.3 | 8.3 | 85 |
| Reference Example 1 | 0.9 | 1.2 | 0.3 | 3.4 | 17.1 | 5.03 | 35 | 5.9 | 8.1 | 82 |

In the honeycomb filter manufactured in Reference Example 1, the ratio of the thermal conductivity of the gas

TABLE 12

|  | Gas permeability coefficient (μm²) | | | Thermal conductivity (W/mK) | | | PM thickness difference (μm) | Regeneration limit value (g/L) | Pressure loss (kPa) | Capturing efficiency (%) |
|---|---|---|---|---|---|---|---|---|---|---|
|  | Inlet side k2 | Outlet side k1 | k1 − k2 | Inlet side | Outlet side | ratio |  |  |  |  |
| Comparative Example 6 | 0.3 | 0.7 | 0.4 | 9.3 | 18.2 | 1.96 | 70 | 3.0 | 11.2 | 85 |
| Comparative Example 7 | 0.4 | 0.9 | 0.5 | 9.7 | 15.5 | 1.60 | 76 | 2.8 | 9.4 | 76 |
| Comparative Example 8 | 1.4 | 2.6 | 1.2 | 5.2 | 7.8 | 1.50 | 40 | 2.5 | 7.5 | 65 |

These honeycomb filters are conventionally known honeycomb filters. However, with regard to the honeycomb filters according to Comparative Examples 6 and 7, the gas permeability coefficient k1 on the gas outlet side was small and the pressure loss was large. Moreover, it is presumed that with regard to the honeycomb filter of Comparative Example 8, the difference in gas permeability coefficients (k1−k2) was large so that the regeneration limit value became low, and since the gas permeability coefficient k2 on the gas inlet side was large, the capturing efficiency became low.

Second Embodiment

In the first embodiment, the honeycomb filter has a structure in which a plurality of honeycomb fired bodies are combined with one another by interposing sealing material layers (adhesive layers); however, the honeycomb filter according to the present embodiment is a honeycomb filter formed by a single honeycomb fired body.

In the present specification, the former honeycomb filter is referred to as an aggregated honeycomb filter and the latter honeycomb filter is referred to as an integral honeycomb filter.

When manufacturing such an integral honeycomb filter, a honeycomb molded body is manufactured through the same method as the method for manufacturing an aggregated honeycomb filter, except that the size of a honeycomb molded body to be molded through the extrusion-molding is larger than the size of a honeycomb molded body forming the aggregated honeycomb filter. Thereafter, the integral honeycomb filter can be manufactured through the same method as that for manufacturing the aggregated honeycomb filter of the first embodiment.

As a main constituent material for the integral honeycomb filter, cordierite and aluminum titanate are desirably used due to their superior thermal impact resistance, and also in the present embodiment, it is possible to obtain the same effects (1) to (6) of the first embodiment.

Other Embodiments

With respect to the shape of the honeycomb filter according to the embodiments of the present invention, it is not particularly limited to the round pillar shape shown in FIG. 1, and the honeycomb filter may have any desired pillar shape, such as a cylindroid shape and a rectangular pillar shape.

The porosity of the honeycomb filter according to the embodiments of the present invention is desirably at least about 30% and at most about 70%.

This structure may make it easier to maintain sufficient strength in the honeycomb filter and to maintain a low level resistance at the time of passage of exhaust gases through the cell wall.

In contrast, the porosity of less than 30% tends to cause clogging in the cell wall in an early stage, while the porosity of more than 70% tends to cause a decrease in strength of the honeycomb filter with the result that the honeycomb filter might be easily broken.

Here, the porosity can be measured through conventionally known methods such as a mercury injection method, Archimedes method, and a measuring method using a scanning electronic microscope (SEM).

The cell density on a cross section perpendicular to the longitudinal direction of the honeycomb filter is not particularly limited. However, a desirable lower limit is about 31.0 pcs/cm2 (about 200 pcs/in2) and a desirable upper limit is about 93.0 pcs/cm2 (about 600 pcs/in2). A more desirable lower limit is about 38.8 pcs/cm2 (about 250 pcs/in2) and a more desirable upper limit is about 77.5 pcs/cm2 (about 500 pcs/in2).

The main component of constituent materials of the honeycomb filter is not limited to silicon carbide, and may include other ceramic materials: a nitride ceramic such as aluminum nitride, silicon nitride, boron nitride, and titanium nitride; a carbide ceramic such as zirconium carbide, titanium carbide, tantalum carbide, and tungsten carbide; a complex of a metal and a nitride ceramic; a complex of a metal and a carbide ceramic; and the like.

Moreover, the constituent materials also include a silicon-containing ceramic formed by compounding a metal silicon into the above-mentioned ceramics and a ceramic material such as a ceramic bonded by a silicon or a silicate compound.

In the case of the aggregated honeycomb filter as described in the first embodiment, silicon carbide is particularly desirably used as the main component of the constituent materials of the honeycomb filter.

This is because silicon carbide is excellent in heat resistant property, mechanical strength, thermal conductivity, and the like.

Moreover, a material formed by compounding metal silicon with silicon carbide (silicon-containing silicon carbide) is also desirable.

Although the particle diameter of silicon carbide powder used in the wet mixture is not particularly limited as long as the gas permeability coefficient k1 on the gas outlet side can be controlled within a desirable range, it is desirable to use the silicon carbide powder that tends not to cause the case where the size of the honeycomb fired body manufactured by the following firing treatment becomes smaller than that of the honeycomb molded body. For example, it is desirable to use a combination of 100 parts by weight of the powder having an average particle diameter of at least about 1.0 µm and at most about 50.0 µm and at least about 5 parts by weight and at most about 65 parts by weight of the powder having an average particle diameter of at least about 0.1 µm and at most about 1.0 µm.

The organic binder in the wet mixture is not particularly limited, and examples thereof include carboxymethyl cellulose, hydroxyethyl cellulose, polyethylene glycol, and the like. Out of these, methylcellulose is more desirably used. In general, the blending amount of the organic binder is desirably at least about 1 part by weight and at most about 10 parts by weight with respect to 100 parts by weight of the ceramic powder.

A plasticizer and a lubricant to be used upon preparing the wet mixture are not particularly limited, and for example, glycerin or the like may be used as the plasticizer. Moreover, as the lubricant, for example, polyoxy alkylene-based compounds, such as polyoxyethylene alkyl ether and polyoxypropylene alkyl ether, may be used.

Specific examples of the lubricant include polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples of the dispersant solution include water, an organic solvent such as benzene, and alcohol such as methanol, and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres including an oxide-based ceramic, spherical acrylic particles, and graphite may be added to the wet mixture, if necessary.

The gas permeability coefficient of the honeycomb filter can be controlled by adjusting the particle diameter of the pore forming agent to be added.

With respect to the balloons, not particularly limited, for example, alumina balloons, glass micro-balloons, shirasu balloons, fly ash balloons (FA balloons), mullite balloons, and the like may be used. Out of these, alumina balloons are more desirably used.

Moreover, the content of organic components in the wet mixture is desirably about 10% by weight or less, and the content of moisture is desirably at least about 8% by weight and at most about 30% by weight.

Although a plug material paste used for sealing cells is not particularly limited, the plug material paste that allows the plugs manufactured through post processes to have a porosity of at least about 30% and at most about 75% is desirably used. For example, the same material as that of the wet mixture may be used.

Examples of the inorganic binder in the sealing material paste include silica sol, alumina sol, and the like. Each of these may be used alone or two or more kinds of these may be used in combination. Silica sol is more desirably used among the inorganic binders.

Examples of the organic binder in the sealing material paste include polyvinyl alcohol, methyl cellulose, ethyl cellulose, carboxymethyl cellulose, and the like. Each of these may be used alone or two or more kinds of these may be used in combination. Carboxymethyl cellulose is more desirably used among the organic binders.

Examples of the inorganic fibers in the sealing material paste include ceramic fibers and the like made from silica-alumina, mullite, alumina, silica, or the like. Each of these may be used alone or two or more kinds of these may be used in combination. Alumina fibers are more desirably used among the inorganic fibers.

Examples of the inorganic particles in the sealing material paste include carbides, nitrides, and the like, and specific examples thereof include inorganic powder and the like made from silicon carbide, silicon nitride, boron nitride, and the like. Each of these may be used alone, or two or more kinds of these may be used in combination. Out of the inorganic particles, silicon carbide is desirably used due to its superior thermal conductivity.

Furthermore, a pore-forming agent, such as balloons that are fine hollow spheres including an oxide-based ceramic, spherical acrylic particles, and graphite may be added to the sealing material paste, if necessary. The balloons are not particularly limited, and for example, alumina balloons, glass micro-balloons, shirasu balloons, fly ash balloons (FA balloons), mullite balloons, and the like may be used. Out of these, alumina balloons are more desirably used.

With respect to the material forming the catalyst supporting layer, the material having a high specific surface area and capable of highly dispersing the catalyst to support the catalyst thereon is desirably used, and examples thereof include an oxide ceramic such as alumina, titania, zirconia, and silica. These materials may be used alone, or two or more kinds of these may be used in combination.

Out of these, the materials having a high specific surface area of about 250 m2/g or more is desirably selected, and γ-alumina is particularly desirable.

Further, the method for forming the catalyst supporting layer made from above-mentioned alumina is not particularly limited to the method explained in the first embodiment. For example, a method may be used in which a honeycomb filter is immersed in a metal compound solution containing aluminum such as an aqueous solution of aluminum nitrate so that the cell walls are coated with an alumina film through a sol-gel method, and the resulting honeycomb filter is dried and fired.

With respect to the catalyst to be supported on the surface of the catalyst supporting layer, for example, noble metals such as platinum, palladium, and rhodium are desirably used. Out of these, platinum is more desirably used. Moreover, with respect to other catalysts, alkali metals such as potassium and sodium, or alkali-earth metals such as barium may be used. Each of these catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter, comprising:
a pillar-shaped honeycomb fired body having a large number of cells longitudinally disposed in parallel with one another with a cell wall therebetween, with either one end of each of said cells being sealed,
wherein said honeycomb fired body has a first end face on a gas inlet side and a second end face on a gas outlet side such that said honeycomb filter is configured to allow gases to flow in through said gas inlet side and to flow out from said gas outlet side,
wherein a catalyst supporting layer is formed in a catalyst-supporting-layer area that covers at least about 25% and at most about 90% of an overall length of said honeycomb fired body and that abuts said first end face on said gas inlet side,
wherein substantially no catalyst supporting layer is formed in a non-catalyst-supporting-layer area that covers about 10% of the overall length of said honeycomb fired body and that abuts said second end face on said a gas outlet side,
wherein a thermal conductivity of said non-catalyst-supporting area is larger than a thermal conductivity of said catalyst-supporting-layer area, and
wherein gas permeability coefficients k1 ($\mu m^2$) and k2 ($\mu m^2$) satisfy the following inequalities (1) and (2):

$$(k1-k2) \leq \text{about } 0.5 \tag{1}$$

$$\text{about } 1.0 \leq k1 \leq \text{about } 1.5 \tag{2},$$

the gas permeability coefficient k1 being a gas permeability coefficient of a cell wall in said non-catalyst-supporting-layer area in said honeycomb filter, the gas permeability coefficient k2 being a gas permeability coefficient of a cell wall in said catalyst-supporting-layer area in said honeycomb filter.

2. The honeycomb filter according to claim 1, wherein a catalyst is supported on said catalyst supporting layer.

3. The honeycomb filter according to claim 2, wherein said catalyst comprises a noble metal, an alkali metal, or an alkali-earth metal.

4. The honeycomb filter according to claim 1, wherein the thermal conductivity of the non-catalyst-supporting layer is at least about 1.3 times and at most about 5.0 times larger than the thermal conductivity of the catalyst-supporting-layer area in said honeycomb filter.

5. The honeycomb filter according to claim 1, wherein a main component of said honeycomb filter comprises a carbide ceramic, a nitride ceramic, a complex of a metal and a carbide ceramic, or a complex of a metal and a nitride ceramic.

6. The honeycomb filter according to claim 1, wherein a main component of said honeycomb filter comprises silicon carbide, silicon carbide containing silicon, cordierite, or aluminum titanate.

7. The honeycomb filter according to claim 1, wherein said catalyst supporting layer is provided continuously from the first end face on the gas inlet side.

8. The honeycomb filter according to claim 1, wherein said catalyst supporting layer is provided continuously from a position apart from the first end face on the gas inlet side.

9. The honeycomb filter according to claim 1, wherein said catalyst supporting layer is formed on the surface of said cell walls, or is formed inside said cell walls.

10. The honeycomb filter according to claim 1, wherein said honeycomb filter is formed of a plurality of said honeycomb fired bodies which are combined with one another by interposing an adhesive layer, or is formed of a single honeycomb fired body.

11. The honeycomb filter according to claim 10, wherein a coat layer is formed on the outer periphery of said honeycomb filter.

12. The honeycomb filter according to claim 1, wherein said catalyst supporting layer comprises an oxide ceramic.

13. The honeycomb filter according to claim 12, wherein said oxide ceramic comprises alumina, titania, zirconia, or silica.

14. An exhaust gas purifying apparatus, said apparatus comprising:
a honeycomb filter;
a casing covering an outside of said honeycomb filter; and
a holding sealing material interposed between said honeycomb filter and said casing,
wherein said honeycomb filter comprises a pillar-shaped honeycomb fired body having a large number of cells longitudinally disposed in parallel with one another with a cell wall therebetween, with either one end of each of said cells being sealed,
wherein said honeycomb fired body has a first end face on a gas inlet side and a second end face on a gas outlet side such that said honeycomb filter is configured to allow gases to flow in through said gas inlet side and to flow out from said gas outlet side,
wherein a catalyst supporting layer is formed in a catalyst-supporting-layer area that covers at least about 25% and at most about 90% of an overall length of said honeycomb fired body and that abuts said first end face on said gas inlet side,
wherein substantially no catalyst supporting layer is formed in a non-catalyst-supporting-layer area that covers about 10% of the overall length of said honeycomb fired body and that abuts said second end face on said gas outlet side,
wherein a thermal conductivity of said non-catalyst-supporting-layer area is larger than a thermal conductivity of said catalyst-supporting-layer area, and
wherein gas permeability coefficients k1 ($\mu m^2$) and k2 ($\mu m^2$) satisfy the following inequalities (1) and (2):

$$(k1-k2) \leq \text{about } 0.5 \quad (1), \text{ and}$$

$$\text{about } 1.0 \leq k1 \leq \text{about } 1.5 \quad (2)$$

the gas permeability coefficient k1 being a gas permeability coefficient of a cell wall in said non-catalyst-supporting-layer area in said honeycomb filter, the gas permeability coefficient k2 being a gas permeability coefficient of a cell wall in said catalyst-supporting-layer area in said honeycomb filter.

15. The apparatus according to claim 14, wherein a catalyst is supported on said catalyst supporting layer.

16. The apparatus according to claim 15, wherein said catalyst comprises a noble metal, an alkali metal, or an alkali-earth metal.

17. The apparatus according to claim 14, wherein the thermal conductivity of the non-catalyst-supporting layer is at least about 1.3 times and at most about 5.0 times larger than the thermal conductivity of the catalyst-supporting-layer area in said honeycomb filter.

18. The apparatus according to claim 14, wherein a main component of said honeycomb filter comprises a carbide ceramic, a nitride ceramic, a complex of a metal and a carbide ceramic, or a complex of a metal and a nitride ceramic.

19. The apparatus according to claim 18, wherein a main component of said honeycomb filter comprises silicon carbide, silicon carbide containing silicon, cordierite, or aluminum titanate.

20. The apparatus according to claim 14, wherein said catalyst supporting layer is provided continuously from the first end face on the gas inlet side.

21. The apparatus according to claim 14, wherein said catalyst supporting layer is provided continuously from a position apart from the first end face on the gas inlet side.

22. The apparatus according to claim 14, wherein said catalyst supporting layer is formed on the surface of said cell walls, or is formed inside said cell walls.

23. The apparatus according to claim 14, wherein said honeycomb filter is formed of a plurality of said honeycomb fired bodies which are combined with one another by interposing an adhesive layer, or is formed of a single honeycomb fired body.

24. The apparatus according to claim 23, wherein a coat layer is formed on the outer periphery of said honeycomb filter.

25. The apparatus according to claim 14, wherein said catalyst supporting layer comprises an oxide ceramic.

26. The apparatus according to claim 25, wherein said oxide ceramic comprises alumina, titania, zirconia, or silica.

* * * * *